United States Patent
Mori et al.

(10) Patent No.: US 8,544,261 B2
(45) Date of Patent: Oct. 1, 2013

(54) EXHAUST GAS PURIFICATION CATALYST AND EXHAUST GAS PURIFICATION APPARATUS USING THE EXHAUST GAS PURIFICATION CATALYST

(75) Inventors: Takeshi Mori, Saitama (JP); Norihiko Suzuki, Saitama (JP); Yuichi Matsuo, Saitama (JP); Atsushi Furukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/674,379

(22) PCT Filed: Aug. 5, 2008

(86) PCT No.: PCT/JP2008/064031
§ 371 (c)(1),
(2), (4) Date: Feb. 19, 2010

(87) PCT Pub. No.: WO2009/025173
PCT Pub. Date: Feb. 26, 2009

(65) Prior Publication Data
US 2011/0107745 A1     May 12, 2011

(30) Foreign Application Priority Data
Aug. 22, 2007   (JP) ................................ 2007-215785

(51) Int. Cl.
*B01J 21/00* (2006.01)
*B01J 23/40* (2006.01)
*B01J 23/48* (2006.01)
*B01J 23/50* (2006.01)

(52) U.S. Cl.
USPC .............. 60/299; 60/297; 502/304; 502/305; 502/306; 502/74; 502/527.12; 502/325; 502/326; 502/327; 502/330; 502/339

(58) Field of Classification Search
USPC ............. 502/304, 305, 306, 74, 527.12, 325, 502/326, 330, 339; 60/299; 422/116, 180
IPC ....................... B01J 21/00, 23/40, 23/48, 23/50
See application file for complete search history.

(56) References Cited

U.S. PATENT DOCUMENTS
6,625,976 B1 *   9/2003   Andersen et al. ................ 60/299
2004/0047774 A1 *   3/2004   Suwabe et al. ................ 422/177
(Continued)

FOREIGN PATENT DOCUMENTS
CN    1714931 A     1/2006
EP    1712278 A1 *   10/2006
(Continued)

OTHER PUBLICATIONS
Machine translation of Tanaka (JP2003-170051).*
(Continued)

*Primary Examiner* — Jun Li
(74) *Attorney, Agent, or Firm* — Arent Fox LLP

(57) ABSTRACT

This invention provides an exhaust gas purification catalyst, which can burn PM (particulate matter) at a temperature below the temperature required in the prior art technique and can realize a high PM combustion rate at elevated temperatures, and an exhaust gas purification apparatus using the exhaust gas purification catalyst. The exhaust gas purification catalyst comprises a composite oxide having oxygen release properties and Ag and a noble metal co-supported on the composite oxide. The exhaust gas purification catalyst and an exhaust gas purification apparatus (1) using the exhaust gas purification catalyst can increase the PM combustion rate at elevated temperatures and, at the same time, can burn PM at a temperature below the temperature required in the prior art technique. Further, fuel consumption loss caused by forced regeneration, EM deterioration, and catalyst deterioration can be suppressed, and, thus, the load on automobiles can be reduced.

10 Claims, 20 Drawing Sheets

(56) References Cited

U.S. PATENT DOCUMENTS

| | | | |
|---|---|---|---|
| 2005/0279372 A1* | 12/2005 | Sundar et al. | 131/334 |
| 2007/0134138 A1 | 6/2007 | Matsuo et al. | |
| 2007/0227130 A1* | 10/2007 | Matsuzono et al. | 60/299 |
| 2007/0238610 A1* | 10/2007 | Chen et al. | 502/330 |

FOREIGN PATENT DOCUMENTS

| | | |
|---|---|---|
| JP | 01-318715 A | 12/1989 |
| JP | 08-173770 A | 7/1996 |
| JP | 2000-502598 A | 3/2000 |
| JP | 2001-073748 A | 3/2001 |
| JP | 2001-157845 A | 6/2001 |
| JP | 2002-357120 A | 12/2002 |
| JP | 2003-170051 A | 6/2003 |
| JP | 2003-293730 A | 10/2003 |
| JP | 2004-042021 A | 2/2004 |
| JP | 2006-110519 A | 4/2006 |
| JP | 2007-196135 A | 8/2007 |
| JP | 2007-296518 A | 11/2007 |
| WO | WO 97/23268 A1 | 7/1997 |
| WO | WO 2006/068022 A1 | 6/2006 |

OTHER PUBLICATIONS

Machine translation of Masuda (JP2001-263051).*
Machine translation of CN1714931A.*
Notice of Reasons for Rejection issued to EP Application No. 088277734.8, mailed Apr. 2, 2012.

\* cited by examiner

AMOUNT OF OXYGEN DESORBED AND COMBUSTION CHARACTERISTICS FROM ADDING ELEMENT (EXAMPLES 2, AND 11 TO 13; AND COMPARATIVE EXAMPLE 10)

EXHAUST GAS PURIFICATION CATALYST AND EXHAUST GAS PURIFICATION APPARATUS USING THE EXHAUST GAS PURIFICATION CATALYST

CROSS-REFERENCE TO RELATED APPLICATION

This application is a National Stage entry of International Application No. PCT/JP2008/064031, filed Aug. 5, 2008, which claims priority to Japanese Patent Application No. 2007-215785, filed Aug. 22, 2007, the disclosure of the prior application is incorporated in its entirety by reference.

TECHNICAL FIELD

The present invention relates to an exhaust gas purification catalyst and an exhaust gas purification apparatus using the same, and in particular, relates to an exhaust gas purification catalyst that can combust particulate matter in exhaust gas at lower temperatures compared to conventionally proposed catalysts and to an exhaust gas purification apparatus using the same.

BACKGROUND ART

In the purification of particulate matter (PM) contained in diesel exhaust gas, a diesel particulate filter (DPF) has been typically used. PM originates mainly in fuel, and is produced from organic material, which is an easily combustible component, soot, which is a difficulty combustible component, and the like. The combustion temperature of organic components is roughly 200° C. to 550° C.; however, temperatures of roughly 550° C. to 700° C. are required in soot combustion. As a result, a conventional catalyzed soot filter (CSF) made by supporting a noble metal catalyst on a DPF shows high purification performance for organic materials, but the purification performance for soot is low.

In view of such facts, the present situation is such that, during PM purification, soot combustion is forcibly performed using additional technology such as regeneration and additives. However, PM collection by a DPF becomes a cause of exhaust gas pressure loss, and by carrying out forced regeneration, troubles occur in that there are disadvantages of the DPF from loss in fuel efficiency and PM combustion heat, and catalyst failure. Therefore, lowering the combustion temperature of PM containing soot has been attempted in order to reduce the burden on automobiles.

A method and the like has been considered in which PM is continuously combusted by a catalyst, in addition to a reduction in regeneration frequency and a high efficiency additive technology, as a method for reducing the burden on automobiles. A noble metal catalyst, a composite oxide catalyst, etc. have been proposed as PM low temperature combustion catalysts used in such a method. According to these catalysts, although acknowledged to be effective in the combustion of soot, the combustion temperature is still a high temperature of 450° C. to 600° C.

For example, a catalyst composition free of platinum group metals has been proposed that includes 5 to 90 mol % by Ag equivalent of ceria ($CeO_2$) stabilized by Ag and/or Co (refer to Patent Document 1). The catalyst composition is prepared by a nitrate decomposition method in this invention, and according to a DPF provided with such a catalyst composition, even if at low temperatures, it is active compared to a DPF equipped with a conventional catalyst, and it is said to excel in both being economical and efficient.

In addition, a DPF cleaning apparatus provided with a catalyst containing silver, copper and oxides thereof and ceria has been proposed (refer to Patent Document 2). According to this invention, a filter used in filtered removal of PM is made that can efficiently purify over the entire operating range of a diesel engine.

In addition, utilization of a composite oxide containing $Ag_2O$ as a catalytically active compound has been proposed in a method that oxidizes liquid or solid pollutants in a gas stream (refer to Patent Document 3). In this invention, the composite oxide containing $Ag_2O$ is manufactured by a solid phase reaction method, and according to this method, it is made possible to reduce and prevent the release of pollutants by separating liquid or solid pollutants from the exhaust gas, and combusting.

In addition, a filter for purifying diesel particulates that includes a heat-resistant 3-dimensional structure that is porous, an intermediate layer composed of $LiAlO_3$ supported on a surface of the heat-resistant 3-dimensional structure, and a catalyst layer supported on an upper surface of the intermediate layer, and uses a catalyst made by supporting a noble metal on a composite oxide, has been proposed (refer to Patent Document 4). According to this invention, it is made possible to prevent emission of SOF by efficiently adsorbing and oxidatively combusting SOF in a low temperature range, while being able to combust dry-soot by utilizing the combustion heat of SOF.

In addition, since nitrogen dioxide ($NO_2$) exhibits high activity in PM combustion, a method of arranging an $NO_2$-generating catalyst upstream of the DPF (refer to Patent Document 5) and a method of applying an $NO_2$-generating catalyst to the DPF (refer to Patent Document 6) have been proposed. According to these methods, even if in a low temperature range in which PM itself normally does not combust, it is made possible to combustively remove PM by utilizing $NO_2$. However, under conditions in which there is little NOx, an effect that promotes combustion of PM is insignificantly small, and under high temperature conditions, the effect of promoting PM combustion by $NO_2$ becomes very small since the concentration equilibrium of NO and $NO_2$ favors the NO side.

In addition, a technique of combining an $NO_2$-generating catalyst and a PM combustion catalyst is also well known since PM combustion efficiency is further increased by $NO_2$. For example, an exhaust purification apparatus of a diesel engine has been proposed that includes a filter in which a first catalyst for $NO_2$ generation and a second catalyst on which $NO_2$ thus converted is reacted with PM are supported in two layers or in a mixed layer state (refer to Patent Document 7). According to this invention, it is made possible to efficiently remove PM by causing $NO_2$ generated by the first catalyst and PM to react at the second catalyst. However, in this invention, since the second catalyst is coated on the first catalyst, or coated in a mixed state, the contact probability of PM with the second catalyst is actually unusually low, and the effect may not be sufficiently exhibited.

In addition an exhaust gas purification material has been proposed that is provided with coated layers including a noble metal catalyst layer in which a noble metal is supported on an inorganic oxide in an outer layer, and including a transition metal catalyst layer containing a transition metal in an inner layer (refer to Patent Document 8). According to this invention, high catalytic activity to PM combustion is obtained. However, since PM combustion is a solid-solid reaction, it is possible for the outer layer catalyst and PM to contact; however, the inner layer catalyst and PM cannot contact, and thus the performance of the inner layer catalyst cannot be sufficiently exhibited.

Patent Document 1: Japanese Patent Application, Publication No. 2004-42021
Patent Document 2: Japanese Patent Application, Publication No. 2001-73748
Patent Document 3: Japanese Translation of PCT International Publication, Publication No. 2000-502598
Patent Document 4: Japanese Patent Application, Publication No. H08-173770
Patent Document 5: Japanese Patent Application, Publication No. H01-318715
Patent Document 6: Japanese Patent Application, Publication No. 2003-293730
Patent Document 7: Japanese Patent Application, Publication No. 2001-263051
Patent Document 8: Japanese Patent Application, Publication No. 2001-157845

DISCLOSURE OF THE INVENTION

Problems to be Solved by the Invention

Incidentally, the temperature of exhaust gas emitted from an internal combustion engine is a low temperature of 200° C. to 450° C.; therefore, without performing a regeneration process or the like, continuously combusting PM in a low exhaust gas temperature range is difficult. As a result, when purifying PM, a regeneration process at high temperatures is essential, and thus a catalyst is required that has sufficient heat resistance.

However, in conventional noble metal catalysts, in addition to occurrence of agglomeration of the noble metal similarly to the case of gasoline exhaust gas, heat resistance cannot be said to be satisfactory since performance decreases due to the structural breakdown of the oxide etc., used as the carrier. In addition, a conventional composite oxide catalyst itself is formed structurally by high temperature firing, and therefore has no problems relating to heat resistance; however, an improvement in the initial performance for soot combustion has become an issue.

In addition, soot may not be completely combusted depending on driving conditions. PM accumulated at this time not only causes plugging of the DPF, but also triggers an increase in pressure loss over the DPF; therefore, it is necessary to periodically remove PM thus accumulated. For example, a DPF regeneration process is performed by way of raising the temperature of the DPF with external energy up to approximately 600° C. to carry out combustive removal.

However, with such a regeneration process, the actual situation is that many demerits arise such as deterioration of fuel efficiency and deterioration of emissions, and complication of the system. In order to mitigate such demerits, it is necessary to lower the temperature during regeneration or shorten the regeneration time.

Therefore, development has been demanded into materials that can combust PM in a low temperature range and that excel in heat resistance. The heat-resisting conditions in diesel exhaust gas are mild relative to gasoline exhaust gas; however, there still exists a need for such materials taking into consideration a coming large displacement/high output engine and an immediately following layout structure.

The present invention takes into account the above problems, and has an object of providing an exhaust gas purification catalyst that can combust PM at lower temperatures and has a high PM combustion rate at high temperatures, and an exhaust gas purification apparatus using the catalyst.

Means for Solving the Problems

In order to solve the above-mentioned problems, the present inventors carried out a thorough investigation. As a result thereof, the present inventors have discovered that the above-mentioned problems could be solved with an exhaust gas purification catalyst made by co-supporting Ag and a noble metal on a composite oxide having an oxygen releasing capacity, thereby arriving at completing the present invention. More specifically, the present invention provides the following.

According to a first aspect, an exhaust gas purification catalyst for removing particulate matter in exhaust emitted from an internal combustion engine, includes a composite oxide having an oxygen releasing capacity, and Ag and a noble metal co-loaded on the composite oxide, in which the composite oxide includes at least two elements selected from the group consisting of an alkali earth metal element, a transition metal element, a periodic group 12 element, and a periodic group 13 element.

According to a second aspect, in the exhaust gas purification catalyst as described in the first aspect, the noble metal includes at least one element selected from the group consisting of Ru, Pd, and Pt, and the content of the noble metal relative to the exhaust gas purification catalyst is in the range of 0.1 mass % to 3.0 mass %.

According to a third aspect, an exhaust gas apparatus that is disposed in an exhaust passage of an internal combustion engine, and that removes particulate matter in exhaust gas emitted from the internal combustion engine, includes a purification unit having a filter and a catalyst layer formed on a surface of the filter, in which the catalyst layer contains the exhaust gas purification catalyst as described in the first or second aspect.

According to a fourth aspect, in the exhaust gas purification apparatus as described in the third aspect, the catalyst layer further contains an $NO_2$-generating catalyst that converts NO in the exhaust gas emitted from the internal combustion engine to $NO_2$.

According to a fifth aspect, in the exhaust gas purification apparatus as described in the fourth aspect, the catalyst layer contains a lower layer that is formed with the exhaust gas purification catalyst, and an upper layer that is formed with the $NO_2$-generating catalyst.

According to a sixth aspect, in the exhaust gas purification apparatus as described in the fourth or fifth aspect, the $NO_2$-generating catalyst is formed by loading at least one element selected from the group consisting of Pt, Pd, and Rh onto a carrier having high specific surface area.

According to a seventh aspect, in the exhaust gas purification apparatus as described in the sixth aspect, the carrier having high specific surface area is at least one carrier selected from the group consisting of alumina, silica, titania, ceria, zirconia, and magnesia.

According to an eighth aspect, in the exhaust gas purification apparatus as described in any one of the fifth to seventh aspects, the catalyst layer contains voids in the upper layer.

According to a ninth aspect, in the exhaust gas purification apparatus as described in the eighth aspect, the voids have a diameter of at least 1 µm.

According to a tenth aspect, in the exhaust gas purification apparatus as described in any one of the third to ninth aspects, the filter is a wall-flow type filter formed from a porous fire-resistant ceramic.

Effects of the Invention

According to the present invention, since Ag and a noble metal having high activity to PM are co-supported on a composite oxide containing at least two elements selected from the group consisting of alkaline-earth metals, transition metals, group 12 elements, and group 13 elements, and an oxygen releasing capacity is provided, the oxygen releasing capacity of the composite oxide can be extracted at lower temperatures, whereby it is possible to further lower the temperature of PM combustion. More specifically, since Ag is supported on a composite oxide, Ag, which is an active species, can be disposed at a contact interface with PM, whereby reactivity with PM is further improved. In addition, since Ag along with a noble metal are co-supported, microparticulation of Ag becomes possible from the blocking effect by the noble metal and the growth in oxygen supply capacity of the noble metal, and a drastic improvement is possible in the oxygen releasing capacity of the composite oxide catalyst having oxygen releasing capacity, and Ag and a noble metal co-supported thereon.

In addition, the heat resistance of the composite oxide is high, and it is possible to suppress agglomeration and volatilization of Ag by the blocking effect due to the noble metal and interactions by way of supporting Ag on the composite oxide; therefore, the exhaust gas purification catalyst according to the present invention excels in heat resistance. As a result, the catalyst can endure use under the floor as well as immediately following the engine, even for high heat-resistance requirements such as the case assumed for large displacement/high output engines in the future, without being influenced by the exhaust layout. Furthermore, since combustion is possible at low temperatures, fuel economy loss, EM deterioration, and catalyst degradation due to forced regeneration can be suppressed, and the burden on the automobile can be reduced.

From understanding that the composite oxide having oxygen releasing capacity also has a high $NO_2$ adsorption capacity, in a case of coexisting with an $NO_2$-generating catalyst, the $NO_2$ concentration on the surface can be maintained high due to $NO_2$ thus generated being adsorbed on the surface of the composite oxide having oxygen releasing capacity. As a result, in addition to the reaction by oxygen and PM with the present catalyst, the reaction between $NO_2$ and PM by Ag is further promoted, and thus the PM combustion rate is further improved. In particular, in a case of adopting a two-layer configuration of the present catalyst and an $NO_2$-generating catalyst, it becomes easy for PM to make contact with the present catalyst due to the voids inside of the $NO_2$-generating catalyst layer being at least 1 μm, thereby further improving the combustion rate.

EXPLANATION OF REFERENCE NUMERALS

Figure 1:
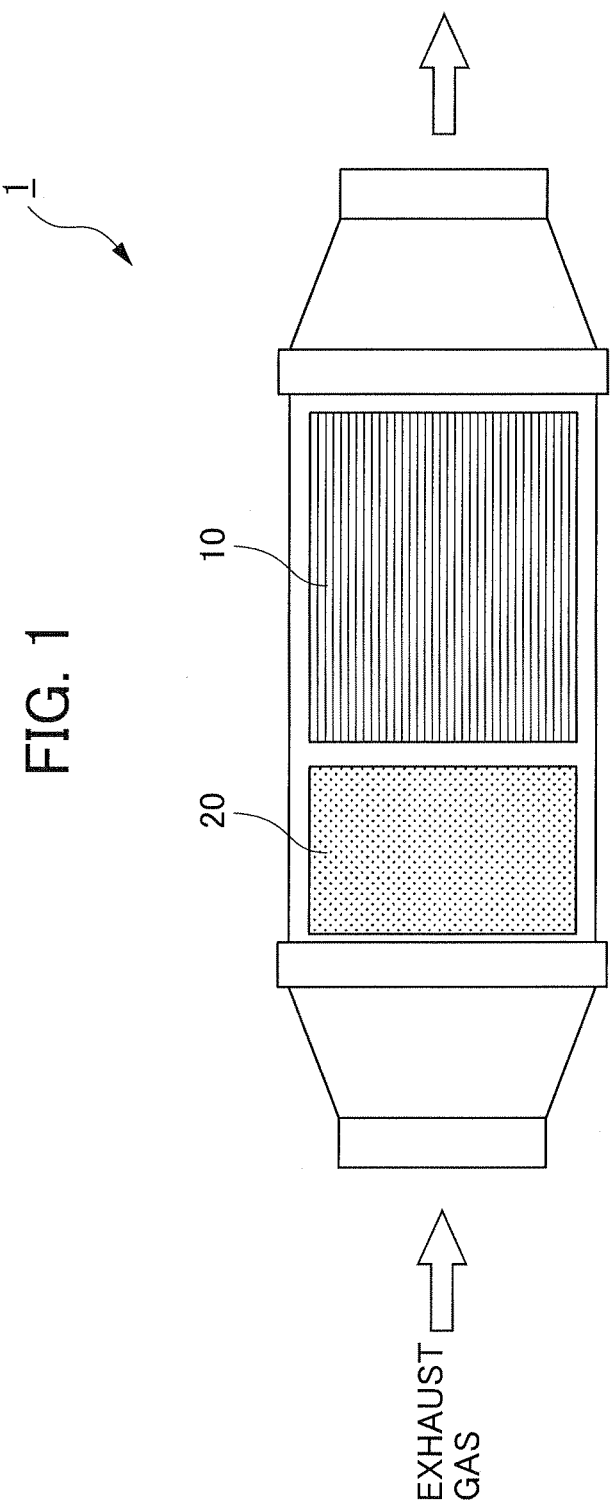
FIG. 1 is a schematic diagram of an exhaust gas purification apparatus 10.

| | |
|---|---|
| 1 | exhaust gas purification apparatus |
| 2 | internal combustion engine |
| 3 | exhaust gas passage |
| 10 | purification unit |
| 11 | filter |
| 12 | exhaust gas inlet path |
| 13 | exhaust gas outlet path |
| 14 | plug |
| 15 | barrier wall |
| 16 | pore |
| 17 | catalyst layer |
| 18 | lower layer |
| 19 | upper layer |
| 19a | void |
| 20 | catalyzed oxidation unit |

PREFERRED MODE FOR CARRYING OUT THE INVENTION

Hereafter, embodiments of the present invention are explained while referring to the drawings.

Exhaust Gas Purification Catalyst

The exhaust gas purification catalyst according to the present embodiment is used in order to purify PM in exhaust gas emitted from an internal combustion engine, and includes a composite oxide having oxygen releasing capacity, and Ag and a noble metal co-supported on this composite oxide, in which the composite oxide contains at least two elements selected from the group consisting of alkaline earth metals, transition metals, periodic group 12 elements, and periodic group 13 elements.

Composite Oxide

The composite oxide used in the exhaust gas purification catalyst according to the present embodiment is characterized in having oxygen releasing capacity. For example, a composite oxide can be used that is selected from the group consisting of perovskite-type, spinel-type, rutile-type, delafossite-type, magnetoplumbite-type, ilmenite-type, and fluorite-type. Among these, composite oxides of perovskite-type and fluorite-type are preferably used from the point of view of heat resistance.

In addition, the above-mentioned composite oxide is characterized in containing at least two elements selected from the group consisting of alkaline earth metals, transition metals, periodic group 12 elements, and periodic group 13 elements. Zr, V, Cr, Mn, Fe, Co, Cu, Nb, Ta, Mo, W, Ce, Pr, Sm, Eu, Tb, Yb, Pt, Pd, Rh, Ir, and Ru can be exemplified as preferred transition metals.

The above-mentioned composite oxide carries out release of oxygen by changing valence numbers. The release of oxygen is a phenomenon in which oxygen inside the lattice of the composite oxide is desorbed in order to maintain charge balance in response to a change in constituent atom valence. Thus, from the view point of imparting oxygen releasing capacity to the composite oxide, it is preferable for at least one type among elements having polyvalence to be contained in the composite oxide. In addition, from the view point of structural stability, it is preferable to contain La, Nd, Y, Sc, Hf, Ca, Sr, and Ba, which have relatively large ion radii without changing valence.

As described above, the composite oxide excels in heat resistance since it is structurally formed by high temperature firing. Here, the composite oxide excelling in heat resistance indicates a composite oxide in which PM combustion performance does not change relative to heat conditions of high temperatures to some extent, or the change is small. In addition, change in PM combustion performance indicates a change within a range in which PM can be sufficiently combusted in a practical exhaust gas temperature range.

The manufacturing method of the above-mentioned composite oxide is not particularly limited, and a well-known conventional manufacturing method may be adopted. For example, a nitrate decomposition method, organic acid complex polymerization method or the like may be suitably adopted.

Ag and Noble Metal

The exhaust gas purification catalyst according to the present embodiment has Ag, which shows high activity to PM, and a noble metal, co-loaded on a composite oxide having oxygen releasing capacity as described above. The noble metal co-loaded with Ag is not particularly limited, and contains at least one element selected from among noble metal elements. In particular, from the view point of enhancing oxygen releasing capacity and Ag miniaturization, at least one element selected from the group consisting of Ru, Pd, and Pt are preferably contained.

The content of the above-mentioned noble metal is preferably a very small amount at 0.1 mass % to 3.0 mass % relative to the exhaust gas purification catalyst. More preferably, the content is 0.5 mass % to 2.0 mass %. In a case of the content of the above-mentioned noble metal being less than 0.1 mass %, the oxygen releasing capacity decreases; and in a case of being greater than 3.0 mass %, interaction between the noble metal and the composite oxide becomes strong, which is not preferred since the loading effect of Ag is, impaired.

The method for co-loading Ag and a noble metal to the above-mentioned composite oxide is not particularly limited, and a well-known conventional method can be adopted. For example, an impregnation method, precipitate deposition method, or the like can be suitably adopted.

Exhaust Gas Purification Apparatus

Figure 2:
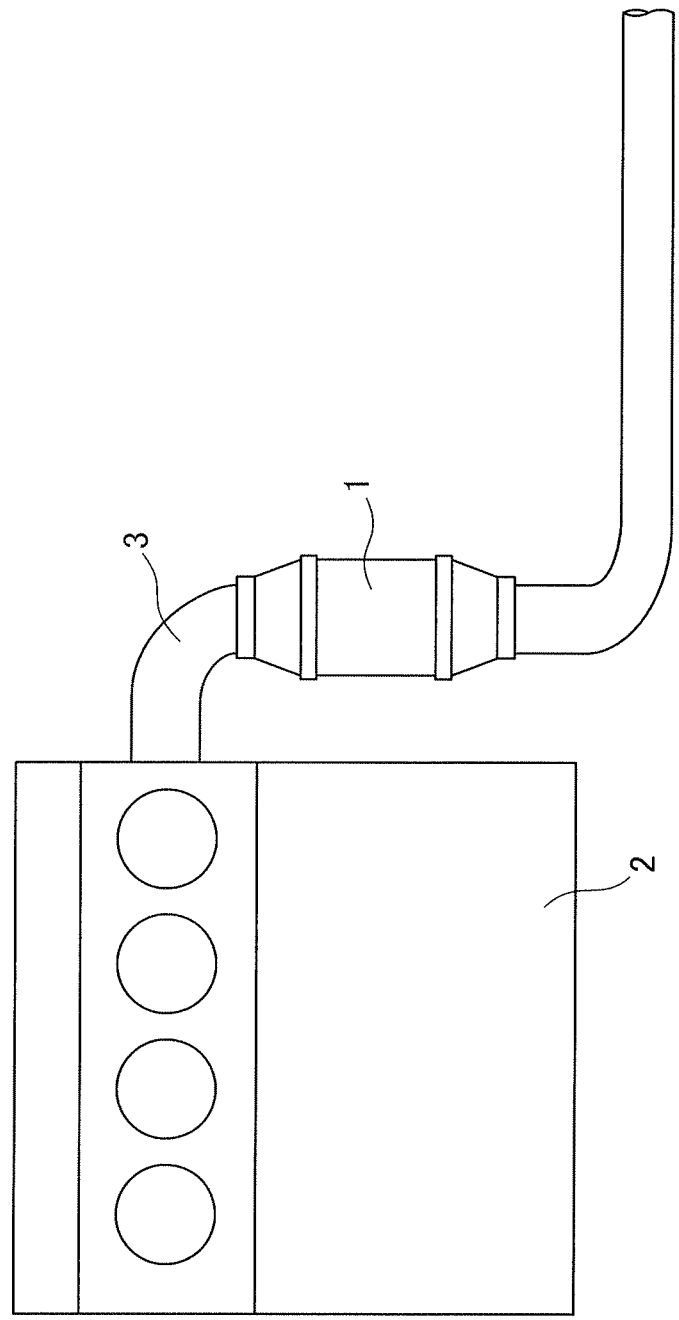
FIG. 2 is a view illustrating the exhaust gas purification apparatus 10.

An exhaust gas purification apparatus 1 according to the present embodiment is shown in FIGS. 1 and 2. The exhaust gas purification apparatus 1 according to the present embodiment is disposed in an exhaust gas passage 3 of an internal combustion engine 2 (e.g., diesel engine), and is used in order to purify PM in exhaust gas emitted from the internal combustion engine 2. A specific configuration of the exhaust gas purification apparatus 1 according to the present embodiment includes a purification unit 10 having a filter, and a catalyst layer formed on a surface of this filter, in which the catalyst layer contains the above-mentioned exhaust gas purification catalyst (hereafter, may be also referred to as Ag-noble metal co-loaded composite oxide catalyst). It should be noted that it may include a catalytic oxidation unit 20 containing an oxidation catalyst upstream of the purification unit 10.

Filter

The above-mentioned filter is not particularly limited, and a well-known conventional filter may be used as long as it has a three-dimensional mesh structure and has a sufficient PM collecting function. More specifically, a foam metal or foam ceramic, a non-woven fabric produced by laminating a metal and a ceramic fiber, a wall flow-type filter, or the like may be exemplified. Among these, a wall flow-type filter is preferably used from the view points of collecting efficiency and accessibility of the catalyst to PM.

Figure 3:
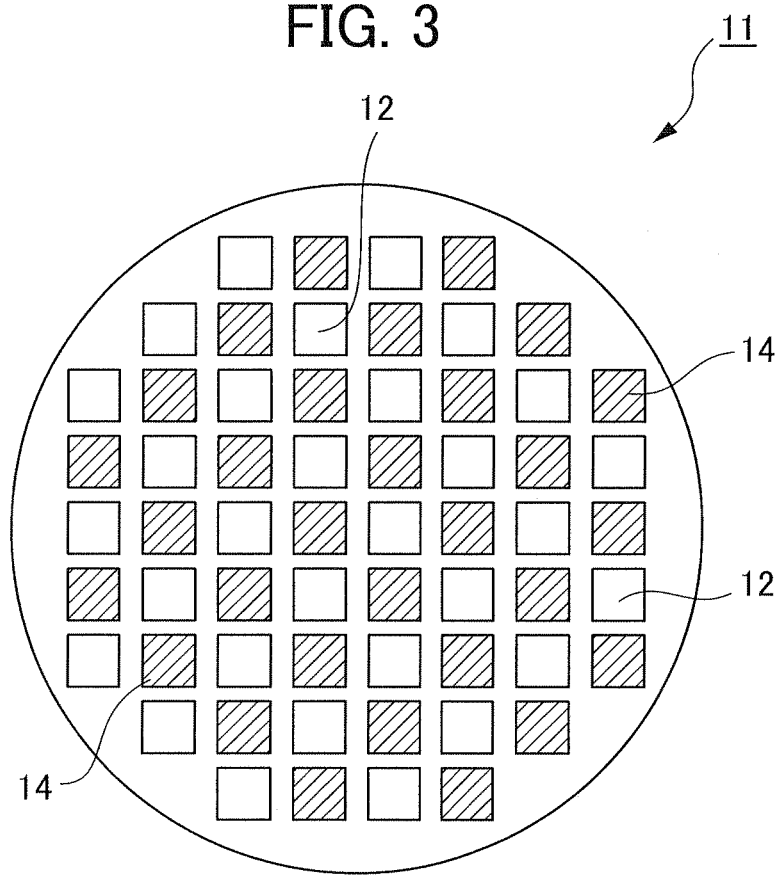
FIG. 3 is a schematic diagram of a filter 11.
Figure 4:
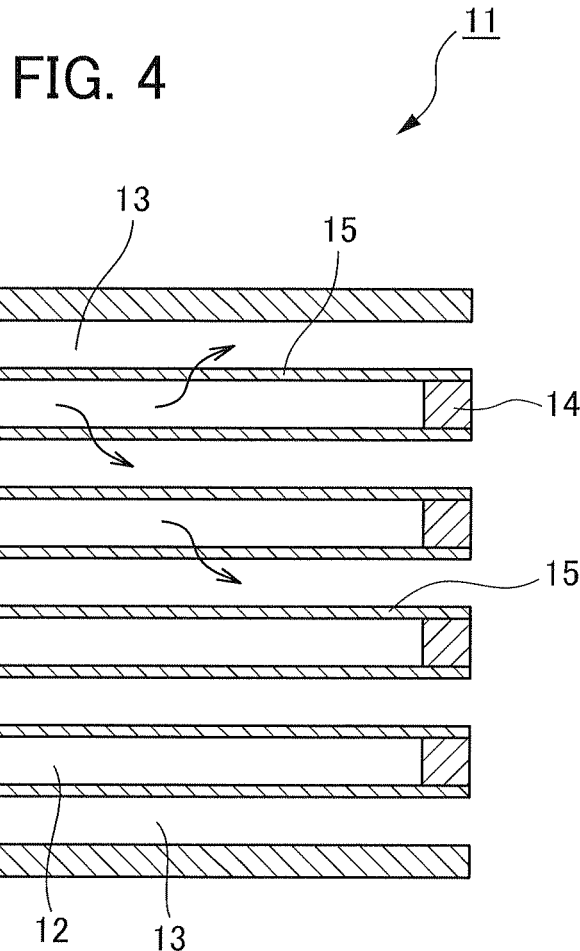
FIG. 4 is a schematic diagram of the filter 11.

A suitable example of the above-mentioned filter is schematically shown in FIGS. 3 and 4. As shown in FIGS. 3 and 4, the filter 11 is made to have a honeycomb structure and is provided with multiple exhaust gas inlet paths 12 and exhaust gas outlet paths 13 that extend parallel to one another. More specifically, the exhaust gas inlet paths 12, which are blocked by plugs 14 at a downstream end of the filter 11, and exhaust gas outlet paths 13, which are blocked by plugs 14 at an upstream end thereof, are provided to be alternating in four, i.e. up to down and side to side, directions. In addition, the exhaust gas inlet paths 12 and the exhaust gas outlet paths 13 are isolated by barrier walls 15 having thin walls.

Figure 5:
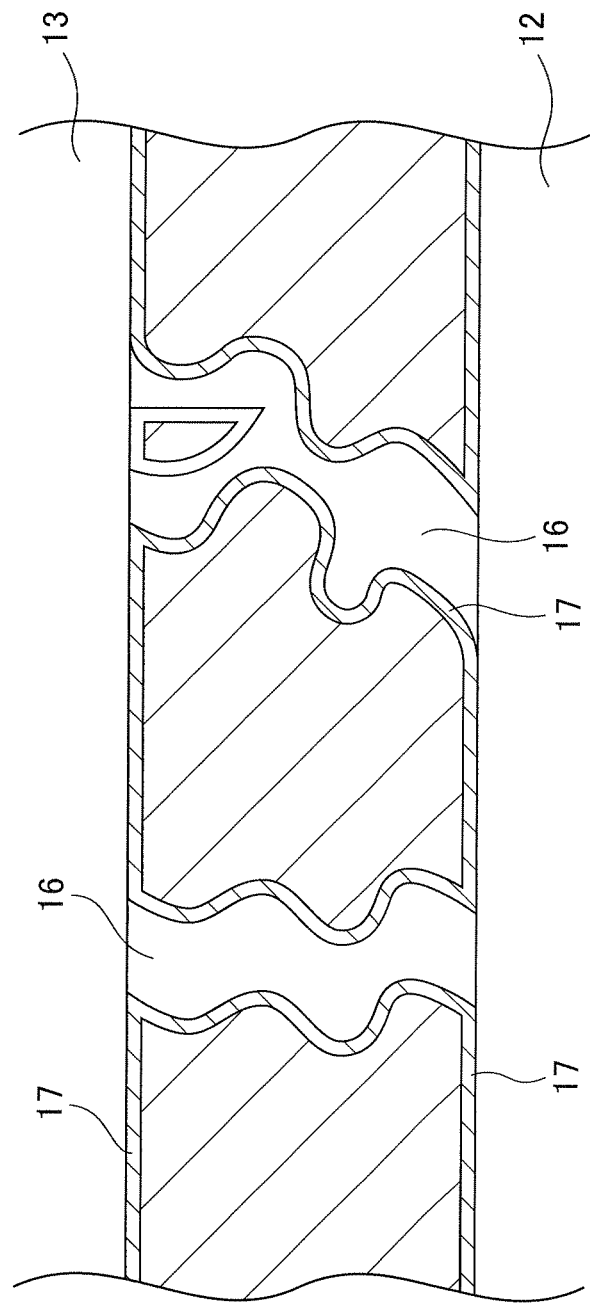
FIG. 5 is a partially enlarged view of the filter 11.

The filter 11 is formed from a highly porous material such as silicon carbide or cordierite, and the exhaust gas flowing into the exhaust gas inlet path 12 flows out into the exhaust gas outlet path 13 adjacent by passing through a surrounding barrier wall 15, as shown by the arrows in FIG. 4. That is, as shown in FIG. 5, the barrier wall 15 includes microscopic pores 16 that communicate the exhaust gas inlet path 12 to the exhaust gas outlet path 13, and the exhaust gas passes through these pores 16. The catalyst layer 17 is formed on wall surfaces of the exhaust gas inlet paths 12, the exhaust gas outlet paths 13, and the pores 16.

Catalyst Layer

Figure 6:
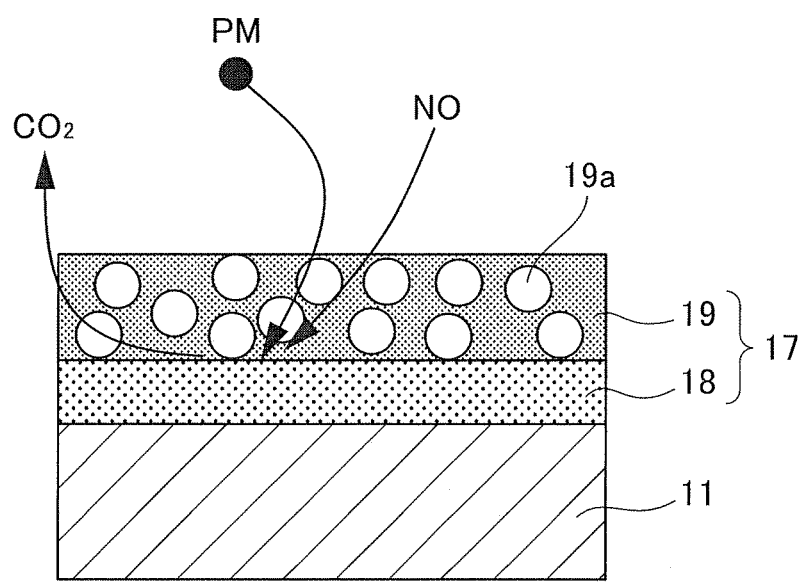
FIG. 6 is a schematic diagram of a catalyst layer 17.

The catalyst layer 17 is formed on the substrate surface of the filter 11, and contains the above-mentioned Ag-noble metal co-loaded composite oxide catalyst. In addition, the catalyst layer 17 preferably has a two-layer structure. A cross-section of the catalyst layer 17 having a two-layer structure is schematically shown in FIG. 6. A lower layer 18, which is at a substrate side of the filter 11, is preferably formed with the above-mentioned Ag-noble metal co-loaded composite oxide catalyst, and an upper layer 19 is preferably formed with an $NO_2$-generating catalyst.

The above-mentioned $NO_2$-generating catalyst is not particularly limited, and a well-known conventional catalyst may be used. Preferably, an $NO_2$-generating catalyst is used in which at least one element selected from the group consisting of Pt, Pd, and Rh, which are noble metals, is supported on at least one carrier selected from the group consisting of alumina, silica, titania, ceria, zirconia, and magnesia, which are high-specific surface area carriers.

Typically, almost all of the nitrogen oxides in exhaust gas are emitted in the form of NO. In the case of adopting the two-layer structure as described above, NO is converted to $NO_2$ by action of the $NO_2$-generating catalyst of the upper layer, and then the $NO_2$ thus generated is supplied to the Ag-noble metal co-loaded composite oxide catalyst of the lower layer. As a result, in addition to the reaction of oxygen and PM by the Ag-noble metal co-loaded composite oxide catalyst, the reaction of $NO_2$ with PM by Ag is promoted, whereby the PM combustion rate increases.

However, in a case where the $NO_2$-generating catalyst is uniformly applied over the entire surface on the upper layer of the Ag-noble metal co-loaded composite oxide catalyst, PM cannot sufficiently contact the Ag-noble metal co-loaded composite oxide catalyst, and thus there is a risk of failure in achieving a sufficient effect. Therefore, voids 19a are preferably formed in the upper layer formed with the $NO_2$-generating catalyst (refer to FIG. 6). From this it is possible for PM to sufficiently contact the Ag-noble metal co-loaded composite oxide catalyst, whereby PM can be efficiently combusted. It should be noted that the particle size distribution of PM is generally known to have a majority distributed at 1 µm or less; therefore, the diameter of the voids 19a may be at least 1 µm.

In addition, it has been found that in a high temperature range around 600° C., the effect of bi-layering is enhanced at higher temperatures. In a case of the configuration being only of the $NO_2$-generating catalyst as indicated in Patent Document 6, this causes it to be difficult for the reaction of $NO_2$ with PM to advance due to the $NO_2$ concentration becoming extremely low at high temperatures around 600° C. according to the equilibrium relationship. However, as described above, in the case of adopting the two-layer structure of the $NO_2$-generating catalyst and the Ag-noble metal co-loaded composite oxide catalyst, the $NO_2$ thus generated is adsorbed to the composite oxide having the oxygen releasing capacity in the Ag-noble metal co-loaded composite oxide catalyst, before the $NO_2$ turns back to NO. In this way, a state is entered in which $NO_2$ is abundantly present near the Ag-noble metal co-loaded composite oxide catalyst, and PM combustion is promoted.

The applied amount of the catalyst is not particularly limited, and is appropriately set within a range that achieves the effects of the present invention. The applied amount of the Ag-noble metal co-loaded composite oxide catalyst of the lower layer is preferably 20 g to 100 g per 1 L of the filter 11, for example. In the case of being less than 20 g, the surface of internal pores in the filter 11 cannot be Sufficiently covered, accessibility with PM worsens, and in the case of exceeding 100 g, pressure loss increases due to plugging of the pores. On the other hand, the applied amount of the $NO_2$-generating catalyst of the upper layer is preferably 10 g to 30 g per 1 L of the filter 11. In the case of being less than 10 g, the $NO_2$ generative capacity is insufficient, and in the case of exceeding 30 g, the thickness of the layer becomes excessively large and it becomes difficult for PM to contact the Ag-noble metal co-loaded composite oxide catalyst.

EXAMPLES

Although the present invention is explained in more detail based on examples, the present invention is not to be limited thereto. It should be noted that, unless particularly defined otherwise, % indicates mass percent and ratio indicates mass ratio.

Example 1

1% Pd, 30% Ag/$LaMnO_3$+PM (5%)

0.01 mols of lanthanum nitrate and manganese nitrate, respectively, which are commercially available special grade chemicals, and the appropriate amount of distilled water were measured, to prepare a solution A. Next, 3.6 g of sodium carbonate and the appropriate amount of distilled water were measured to prepare a solution B. While mixing the solution B at 300 rpm and 60° C., the solution A was added drop-wise at a rate of 7 ml/min (reverse coprecipitation method). The precipitate was filtered and washed with distilled water until the pH became neutral, dried at 200° C. for 2 h, and then dried to solidify at 350° C. for 3 h. This was granulated to be no greater than 2 µm, and then dried at 800° C. for 10 h to prepare a catalyst A.

6.9 g of the catalyst A, 4.72 g of silver nitrate, 1.99 g of palladium nitrate and the appropriate amount of distilled water were measured, to prepare a solution C. The solution C was evaporated to dryness with an evaporator, dried at 200° C. for 2 h, and then fired at 700° C. for 2 h (impregnation method). This was granulated to be no greater than 2 µm to prepare a catalyst B. Example 1 was prepared by mixing 9.5 mg of this catalyst B with 0.5 mg of PM, and then allowing for tight contact according to a method described later.

Example 2

1% Pd 30% Ag/$CeZrO_2$+PM (5%)

With commercially available high-specific surface area ceria zirconia (Ce:Zr=2:8, 71 $m^2$/g, manufactured by Anan Kasei Co., Ltd.) as a catalyst C, a catalyst D was prepared similarly to the above-mentioned catalyst B with the catalyst C, silver nitrate and palladium nitrate. Example 2 was prepared by allowing for tight contact of the catalyst D similarly to the above-mentioned Example 1.

Example 3

1% Pd 30% Ag/$CoTa_2O_6$+PM (5%)

A catalyst E was prepared by a reverse coprecipitation method similarly to that described above with cobalt nitrate, tantalum oxide, sodium carbonate, which are commercially available special grade chemicals, and distilled water. A catalyst F was prepared similarly to the above-mentioned catalyst B with the catalyst E, silver nitrate and palladium nitrate. Example 3 was prepared by allowing for tight contact of this catalyst F similarly to the above-mentioned Example 1.

Example 4

1% Pd 30% Ag/$PtCoO_2$+PM (5%)

A catalyst G was prepared by a reverse coprecipitation method similarly to that described above with cobalt nitrate, dinitrodiammineplatinum nitrate, sodium carbonate, which are commercially available special grade chemicals, and distilled water. A catalyst H was prepared similarly to the above-mentioned catalyst B with the catalyst G, silver nitrate and palladium nitrate. Example 4 was prepared by allowing for tight contact of this catalyst H similarly to the above-mentioned Example 1.

Example 5

1% Pd 30% Ag/$ZnCO_2O_4$+PM (5%)

A catalyst I was prepared by a reverse coprecipitation method similarly to that described above with cobalt nitrate, zinc nitrate, sodium carbonate, which are commercially available special grade chemicals, and distilled water. A catalyst J was prepared similarly to the above-mentioned catalyst B with the catalyst I, silver nitrate and palladium nitrate. Example 5 was prepared by allowing for tight contact of this catalyst J similarly to the above-mentioned Example 1.

Example 6

1% Pd 30% Ag/$W_{0.67}Ca_{0.67}Mn_{0.67}O_3$+PM (5%)

A catalyst K was prepared by a reverse coprecipitation method similarly to that described above with ammonium tungstate, calcium nitrate, manganese nitrate, sodium carbonate, which are commercially available special grade chemicals, and distilled water. A catalyst L was prepared similarly to the above-mentioned catalyst B with the catalyst K, silver nitrate, and palladium nitrate. Example 6 was prepared by allowing for tight contact of this catalyst similarly to the above-mentioned Example 1.

Examples 7 to 10 x % Pd 30% Ag/$CeZrO_2$+PM (5%) (x=0.1, 0.5, 2, 3)

Catalysts M to P were prepared similarly to the above-mentioned catalyst B by measuring the above-mentioned catalyst C, silver nitrate and palladium nitrate so as to make a predetermined composition. Examples 7 to 10 were prepared by allowing for tight contact of the catalysts M to P similarly to the above-mentioned Example 1.

Examples 11 and 12

1% X 30% Ag/$CeZrO_2$+PM (5%) (X=Pt, Ru)

Catalysts Q and R were prepared similarly to the above-mentioned catalyst B by measuring the above-mentioned catalyst C, silver nitrate and nitrate salts ($XNO_3$, X=Pt, Ru) so as to make a predetermined composition. Examples 11 and 12 were prepared by allowing for tight contact of catalysts Q and R similarly to the above-mentioned Example 1.

Example 13

1% PtPd (2:1) 30% Ag/$CeZrO_2$+PM (5%)

A catalyst S was prepared similarly to the above-mentioned catalyst B by measuring the above-mentioned catalyst C, silver nitrate, and platinum nitrate or palladium nitrate so as to make a predetermined composition. Example 13 was prepared by allowing for tight contact of this catalyst S similarly to the above-mentioned Example 1.

Example 14

1% Pd 30% Ag/$LaMnO_3$+PM (5%)–800° C. Aging

A catalyst T was prepared by aging the above-mentioned catalyst B in air at 800° C. for 20 h. Example 14 was prepared by allowing for tight contact of this catalyst T similarly to the above-mentioned Example 1.

Example 15

1% Pd 30% Ag/$CeZrO_2$+PM (5%)–800° C. Aging

A catalyst U was prepared by aging the above-mentioned catalyst D in air at 800° C. for 20 h. Example 15 was prepared by allowing for tight contact of this catalyst U similarly to the above-mentioned Example 1.

Example 16

1% Pd 30% Ag/$LaMnO_3$+PM (5%)–900° C. Aging

A catalyst V was prepared by aging the above-mentioned catalyst B in air at 900° C. for 20 h. Example 16 was prepared by allowing for tight contact of this catalyst V similarly to the above-mentioned Example 1.

Example 17

1% Pd 30% Ag/$CeZrO_2$+PM (5%)–900° C. Aging

A catalyst W was prepared by aging the above-mentioned catalyst D in air at 900° C. for 20 h. Example 17 was prepared by allowing for tight contact of this catalyst W similarly to the above-mentioned Example 1.

Comparative Example 1

PM

PM powder itself collected from a diesel engine generator was prepared as Comparative Example 1.

Comparative Example 2

0.76% Pt/$Al_2O_3$+PM (5%)

1.51 g of a dinitrodiammineplatinum nitrate solution of a commercially available special grade chemical, 9.92 g of $Al_2O_3$ and the appropriate amount of distilled water were measured, and then these were evaporated to dryness with an evaporator to cause the platinum to be supported on the $Al_2O_3$. A catalyst AA was prepared after drying at 200° C., and firing at 600° C. for 2 h. Comparative Example 2 was prepared by allowing for tight contact of this catalyst AA similarly to the above-mentioned Example 1.

Comparative Example 3

$LaMnO_3$+PM (5%)

Comparative Example 3 was prepared by allowing for tight contact of the above-mentioned catalyst A similarly to the above-mentioned Example 1.

Comparative Example 4

$CeZrO_2$+PM (5%)

Comparative Example 4 was prepared by allowing for tight contact of the above-mentioned catalyst C similarly to the above-mentioned Example 1.

Comparative Example 5

$CoTa_2O_6$+PM (5%)

Comparative Example 5 was prepared by allowing for tight contact of the above-mentioned catalyst E similarly to the above-mentioned Example 1.

Comparative Example 6

$PtCoO_2$+PM (5%)

Comparative Example 6 was prepared by allowing for tight contact of the above-mentioned catalyst G similarly to the above-mentioned Example 1.

Comparative Example 7

$ZnCO_2O_4$+PM (5%)

Comparative Example 7 was prepared by allowing for tight contact of the above-mentioned catalyst I similarly to the above-mentioned Example 1.

Comparative Example 8

$W_{0.67}Ca_{0.67}Mn_{0.67}O_3$+PM (5%)

Comparative Example 8 was prepared by allowing for tight contact of the above-mentioned catalyst K similarly to the above-mentioned Example 1.

Comparative Example 9

30% Ag/$LaMnO_3$+PM (5%)

A catalyst AB was prepared similarly to the above-mentioned catalyst B with the above-mentioned catalyst A, silver nitrate and distilled water. Comparative Example 9 was prepared by allowing for tight contact of this catalyst AB similarly to the above-mentioned Example 1.

Comparative Example 10

30% Ag/$CeZrO_2$+PM (5%)

A catalyst AC was prepared similarly to the above-mentioned catalyst B with the above-mentioned catalyst C, silver nitrate and distilled water. Comparative Example 10 was prepared by allowing for tight contact of the catalyst AC similarly to the above-mentioned Example 1.

Comparative Example 11

30% Ag/$CoTa_2O_6$+PM (5%)

A catalyst AD was prepared similarly to the above-mentioned catalyst B with the above-mentioned catalyst E, silver nitrate and distilled water. Comparative Example 11 was prepared by allowing for tight contact of this catalyst AD similarly to the above-mentioned Example 1.

Comparative Example 12

30% Ag/$PtCoO_2$+PM (5%)

A catalyst AE was prepared similarly to the above-mentioned catalyst B with the above-mentioned catalyst G, silver nitrate and distilled water. Comparative Example 12 was prepared by allowing for tight contact of this catalyst AE similarly to the above-mentioned Example 1.

Comparative Example 13

30% Ag/$ZnCO_2O_4$+PM (5%)

A catalyst AF was prepared similarly to the above-mentioned catalyst B with the above-mentioned catalyst I, silver nitrate and distilled water. Comparative Example 13 was prepared by allowing for tight contact of this catalyst AF similarly to the above-mentioned Example 1.

Comparative Example 14

30% Ag/$W_{0.67}Ca_{0.67}Mn_{0.67}O_3$+PM (5%)

A catalyst AG was prepared similarly to the above-mentioned catalyst B with the above-mentioned catalyst K, silver nitrate and distilled water. Comparative Example 14 was prepared by allowing for tight contact of this catalyst AG similarly to the above-mentioned Example 1.

Comparative Example 15

$Ag_2O$+PM (5%)

Comparative Example 15 was prepared by allowing for tight contact of a commercially available silver nitrate of special chemical grade similarly to the above-mentioned Example 1.

Comparative Examples 16 and 17 x % Pd 30% Ag/$CeZrO_2$+PM (5%) (x=5, 14)

Catalysts AH and AI were prepared similarly to the above-mentioned catalyst B with the above-mentioned catalyst C, silver nitrate, palladium nitrate and distilled water so as to make a predetermined composition. Comparative Examples 16 and 17 were prepared by allowing for tight contact of the catalysts AH and AI similarly to the above-mentioned Example 1.

Comparative Example 18

30% Ag/$LaAlO_3$+PM (5%)

A catalyst AJ was prepared by a reverse coprecipitation method similarly to that described above with lanthanum nitrate, aluminum nitrate, sodium carbonate, which are commercially available special grade chemicals, and distilled water. A catalyst AK was prepared with an impregnation method similarly to the above-mentioned catalyst B by measuring the catalyst AJ, silver nitrate and distilled water so as to make a predetermined composition. Comparative Example 18 was prepared by allowing for tight contact of this catalyst AK similarly to the above-mentioned Example 1.

Comparative Example 19

30% Ag/$La_2O_3$+PM (5%)

A catalyst AL was prepared by a reverse coprecipitation method similarly to that described above with lanthanum nitrate, sodium carbonate, which are commercially available special grade chemicals, and distilled water. A catalyst AM was prepared with an impregnation method similarly to the above-mentioned catalyst B by measuring the catalyst AL, silver nitrate and distilled water so as to make a predetermined composition. Comparative Example 19 was prepared by allowing for tight contact of this catalyst AM similarly to the above-mentioned Example 1.

Comparative Example 20

30% Ag/MnO$_2$+PM (5%)

A catalyst AN was prepared by a reverse coprecipitation method similarly to that described above with manganese nitrate, sodium carbonate, which are commercially available special grade chemicals, and distilled water. A catalyst AO was prepared with an impregnation method similarly to the above-mentioned catalyst B by measuring the catalyst AN, silver nitrate and distilled water so as to make a predetermined composition. Comparative Example 20 was prepared by allowing for tight contact of this catalyst AO similarly to the above-mentioned Example 1.

Comparative Example 21

30% Ag/(La$_2$O$_2$+MnO$_2$)+PM (5%)

A catalyst AP was prepared by pulverizing with a mortar and pestle 1 g of the above-mentioned catalyst AL and 1 g of the catalyst AN and mixing, and then firing at 800° C. for 10 h. A catalyst AQ was prepared with an impregnation method similarly to the above-mentioned catalyst B by measuring the catalyst AP, silver nitrate and distilled water so as to make a predetermined composition. Comparative Example 21 was prepared by allowing for tight contact of this catalyst AQ similarly to the above-mentioned Example 1.

Comparative Example 22

1% Pt/CeZrO$_2$+PM (5%)

A catalyst AR was prepared with an impregnation method similarly to that described above by measuring the above-mentioned catalyst C, a dinitrodiammineplatinum nitrate solution and distilled water so as to make a predetermined composition. Comparative Example 22 was prepared by allowing for tight contact of this catalyst AR similarly to the above-mentioned Example 1.

Comparative Example 23

1% Pd/CeZrO$_2$+PM (5%)

A catalyst AS was prepared by a reverse coprecipitation method similarly to that described above by measuring the above-mentioned catalyst C, palladium nitrate and distilled water so as to make a predetermined composition. Comparative Example 23 was prepared by allowing for tight contact of this catalyst AS similarly to the above-mentioned Example 1.

Comparative Example 24

Ag$_{0.8}$La$_{0.2}$MnO$_3$+PM (5%)

A solution D was prepared by measuring 0.04 mol, 0.01 mol and 0.05 mol of silver nitrate, lanthanum nitrate, and manganese nitrate, respectively, which are commercially available special grade chemicals, and the appropriate amount of distilled water. The solution D was evaporated to dryness while mixing at 300 rpm and 250° C., dried at 200° C. for 2 h, and then preliminarily fired at 350° C. for 3 h. Thereafter, a catalyst AT was prepared by granulating so as not be greater than 2 μm, and carrying out firing at 800° C. for 10 h. Comparative Example 24 was prepared by allowing for tight contact of this catalyst AT similarly to the above-mentioned Example 1.

Comparative Example 25

(30% Ag$_2$O+LaMnO$_3$)+PM (5%)

7 g of the above-mentioned catalyst A and 3 g of silver oxide were measured, and then physically mixed with a mortar and pestle. A catalyst AU was prepared by firing the mixture at 800° C. for 10 h, and causing a solid-phase reaction. Comparative Example 25 was prepared by allowing for tight contact of this catalyst AU similarly to the above-mentioned Example 1.

Comparative Example 26

1% Pd 30% Ag/CeO$_2$+PM (5%)

A catalyst AV was prepared by a reverse coprecipitation method similarly to the above-mentioned Example 1 with cerium nitrate, sodium carbonate, which are commercially available special grade chemicals, and distilled water. A catalyst AW was prepared with an impregnation method similarly to the above-mentioned catalyst B by measuring the catalyst AV, silver nitrate, palladium nitrate and distilled water so as to make a predetermined composition. Comparative Example 26 was prepared by allowing for tight contact of this catalyst AW similarly to the above-mentioned Example 1.

Comparative Example 27

1% Pd 30% Ag/CeO$_2$–800° C. Aging+PM (5%)

A catalyst AX was prepared by aging the above-mentioned catalyst AW in air at 800° C. for 6 h. Comparative Example 27 was prepared by allowing for tight contact of this catalyst AX similarly to the above-mentioned Example 1.

Comparative Example 28

1% Pd 30% Ag/CeO$_2$–900° C. Aging+PM (5%)

A catalyst AY was prepared by aging the above-mentioned catalyst AW in air at 900° C. for 6 h. Comparative Example 28 was prepared by allowing for tight contact of this catalyst AY similarly to the above-mentioned Example 1.

For each catalyst obtained in Examples 1 to 17 and Comparative Examples 1 to 28, the types of carrier and the types of metal supported on the carrier are collectively shown in Tables 1 and 2. In addition, for each catalyst, evaluation of PM combustion characteristics and evaluation of crystal structure were performed under conditions described later. The results of these evaluations are collectively shown in Tables 1 and 2. Furthermore, for a portion of the catalysts, evaluation was carried out for oxygen desorption characteristics under the conditions described later.

TABLE 1

| Sample | Composition | Noble metal state | Added element | Carrier | Aged (° C.) | Structure | PM combustion peak temperature (° C.) |
|---|---|---|---|---|---|---|---|
| Example 1 | 1% Pd30% Ag/LaMnO$_3$ + PM(5%) | Ag loaded | Pd | composite oxide | — | perovskite | 369 |
| Example 2 | 1% Pd30% Ag/CeZrO$_2$ + PM(5%) | Ag loaded | Pd | composite oxide | — | fluorite | 317 |
| Example 3 | 1% Pd30% Ag/CoTa$_2$O$_6$ + PM(5%) | Ag loaded | Pd | composite oxide | — | rutile | 379 |
| Example 4 | 1% Pd30% Ag/PtCoO$_2$ + PM(5%) | Ag loaded | Pd | composite oxide | — | delafossite | 380 |
| Example 5 | 1% Pd30% Ag/ZnCo$_2$O$_4$ + PM(5%) | Ag loaded | Pd | composite oxide | — | spinel | 374 |
| Example 6 | 1% Pd30% Ag/W$_{0.67}$Ca$_{0.67}$Mn$_{0.67}$ + PM(5%) | Ag loaded | Pd | composite oxide | — | — | 410 |
| Example 7 | 0.1% Pd30% Ag/CeZrO$_2$ + PM(5%) | Ag loaded | Pd | composite oxide | — | fluorite | 330 |
| Example 8 | 0.5% Pd30% Ag/CeZrO$_2$ + PM(5%) | Ag loaded | Pd | composite oxide | — | fluorite | 325 |
| Example 9 | 2% Pd30% Ag/CeZrO$_2$ + PM(5%) | Ag loaded | Pd | composite oxide | — | fluorite | 323 |
| Example 10 | 3% Pd30% Ag/CeZrO$_2$ + PM(5%) | Ag loaded | Pd | composite oxide | — | fluorite | 334 |
| Example 11 | 1% Pt30% Ag/CeZrO$_2$ + PM(5%) | Ag loaded | Pt | composite oxide | — | fluorite | 325 |
| Example 12 | 1% Ru30% Ag/CeZrO$_2$ + PM(5%) | Ag loaded | Ru | composite oxide | — | fluorite | 331 |
| Example 13 | 1% PtPd30% Ag/CeZrO$_2$ + PM(5%) | Ag loaded | PtPd | composite oxide | — | fluorite | 318 |
| Example 14 | 1% Pd30% Ag/LaMnO$_3$ – 800° C. Aging + PM(5%) | Ag loaded | Pd | composite oxide | 800 | perovskite | 378 |
| Example 15 | 1% Pd30% Ag/CeZrO$_2$ – 800° C. Aging + PM(5%) | Ag loaded | Pd | composite oxide | 800 | fluorite | 336 |
| Example 16 | 1% Pd30% Ag/LaMnO$_3$ – 900° C. Aging + PM(5%) | Ag loaded | Pd | composite oxide | 900 | perovskite | 377 |
| Example 17 | 1% Pd30% Ag/CeZrO$_2$ – 900° C. Aging + PM(5%) | Ag loaded | Pd | composite oxide | 900 | fluorite | 350 |

TABLE 2

| Sample | Composition | Noble metal state | Added element | Carrier | Aged (° C.) | Structure | PM combustion peak temperature (° C.) |
|---|---|---|---|---|---|---|---|
| Comparative Example 1 | PM only | — | — | — | — | — | 668 |
| Comparative Example 1 | 0.76% Pt/Al$_2$O$_3$ + PM(5%) | Pt loaded | — | oxide | — | — | 247/561 |
| Comparative Example 3 | LaMnO$_3$ + PM(5%) | — | — | composite oxide | — | perovskite | 454 |
| Comparative Example 4 | CeZrO$_2$ + PM(5%) | — | — | composite oxide | — | fluorite | 408 |
| Comparative Example 5 | CoTa$_2$O$_6$ + PM(5%) | — | — | composite oxide | — | rutile | 530 |
| Comparative Example 6 | PtCoO$_2$ + PM(5%) | — | — | composite oxide | — | delafossite | 501 |
| Comparative Example 7 | ZnCo$_2$O$_4$ + PM(5%) | — | — | composite oxide | — | spinel | 440 |
| Comparative Example 8 | W$_{0.67}$Ca$_{0.67}$Mn$_{0.67}$ + PM(5%) | — | — | composite oxide | — | — | 454 |
| Comparative Example 9 | 30% Ag/LaMnO$_3$ + PM(5%) | Ag loaded | — | composite oxide | — | perovskite | 421 |
| Comparative Example 10 | 30% Ag/CeZrO$_2$ + PM(5%) | Ag loaded | — | composite oxide | — | fluorite | 334 |
| Comparative Example 11 | 30% Ag/CoTa$_2$O$_6$ + PM(5%) | Ag loaded | — | composite oxide | — | rutile | 399 |
| Comparative Example 12 | 30% Ag/PtCoO$_2$ + PM(5%) | Ag loaded | — | composite oxide | — | delafossite | 400 |
| Comparative Example 13 | 30% Ag/ZnCo$_2$O$_4$ + PM(5%) | Ag loaded | — | composite oxide | — | spinel | 394 |
| Comparative Example 14 | 30% Ag/W$_{0.67}$Ca$_{0.67}$Mn$_{0.67}$ + PM(5%) | Ag loaded | — | composite oxide | — | — | 430 |
| Comparative Example 15 | Ag$_2$O + PM(5%) | Silver oxide | — | — | — | — | 244 |
| Comparative Example 16 | 5% Pd30% Ag/CeZrO$_2$ + PM (5%) | Ag loaded | Pd | composite oxide | — | fluorite | 381 |
| Comparative Example 17 | 14% Pd30% Ag/CeZrO$_2$ + PM (5%) | Ag loaded | Pd | composite oxide | | fluorite | 409 |
| Comparative Example 18 | 30% Ag/LaAlO$_3$ + PM(5%) | Ag loaded | — | composite oxide | — | perovskite | 521 |
| Comparative Example 19 | 30% Ag/La$_2$O$_3$ + PM(5%) | Ag loaded | — | oxide | — | — | 468 |
| Comparative Example 20 | 30% Ag/MnO$_2$ + PM(5%) | Ag loaded | — | oxide | — | — | 435 |
| Comparative Example 21 | 30% Ag/(La$_2$O$_3$ + MnO$_2$) + PM(5%) | Ag loaded | — | physically mixed oxide | — | — | 445 |

TABLE 2-continued

| Sample | Composition | Noble metal state | Added element | Carrier | Aged (° C.) | Structure | PM combustion peak temperature (° C.) |
|---|---|---|---|---|---|---|---|
| Comparative Example 22 | 1% Pt/CeZrO$_2$ + PM(5%) | Pt loaded | — | composite oxide | — | fluorite | 417 |
| Comparative Example 23 | 1% Pd/CeZrO$_2$ + PM(5%) | Pd loaded | — | composite oxide | — | fluorite | 404 |
| Comparative Example 24 | Ag$_{0.8}$La$_{0.2}$MnO$_3$ + PM(5%) | Ag solid solution | — | composite oxide | — | perovskite | 430 |
| Comparative Example 25 | (30% Ag$_2$O + LaMnO$_3$) + PM (5%) | Ag$_2$O solid-phase reaction | — | composite oxide | — | perovskite | 449 |
| Comparative Example 26 | 1% Pd30% AgCeO$_2$ + PM(5%) | Ag loaded | — | oxide | — | — | 318 |
| Comparative Example 27 | 1% Pd30% Ag/CeO$_2$ – 800° C. Aging + PM (5%) | Ag loaded | Pd | oxide | 800 | — | 358 |
| Comparative Example 28 | 1% Pd30% Ag/CeO$_2$ – 900° C. Aging + PM(5%) | Ag loaded | Pd | oxide | 900 | — | 403 |

Evaluation of PM Combustion Characteristics

For catalysts produced in each of the Examples and Comparative Examples, TG/DTA measurement was carried out under the following conditions, and evaluation of PM combustion characteristics was performed with the thermal characteristics (DTA) and the peak temperatures thereof as indices. More specifically, examination was carried out for temperatures when the amount of heat evolved in PM combustion formed peaks (PM combustion peak temperature).

Measurement Apparatus: EXSTER6000TG/DTA manufactured by Seiko Instruments Corporation Heating rate condition: 20° C./min Atmosphere: dry air Sample amount: 10 mg Flow rate: space velocity (SV)=60000 h$^{-1}$ Tight contact: mixing and pulverizing to 2 µm or smaller with mortar and pestle Evaluation of Crystal Structure For catalysts produced in each of the Examples and Comparative Examples, X-ray diffractometry was performed under the following conditions, and evaluation of the crystal structures thereof was carried out. In addition, crystallite diameter was calculated from the half bandwidth of X-ray diffraction spectra obtained from measurement.

Measurement apparatus: X-ray diffractometer (RINT TTRIII) manufactured by Rigaku Corporation X-ray tube: Cu—Kα

Tube voltage: 60 kV

Tube current: 300 mA

Measurement method: level goniometer, fixed monochromator, continuous scan mode

Measurement range: 2θ=10° to 90°

Measurement interval: 0.02°

Evaluation of Oxygen Desorption Characteristics

Evaluation of oxygen desorption characteristics was performed by O$_2$-TPD (temperature-programmed desorption) experiment under the following conditions.

Measurement apparatus: TPD1TPR Analyzer (MS-Q-MS) manufactured by Nippon Bel Corporation Sample: pretreated at 800° C. for 30 min with 20% O$_2$ flow, then cooled in air to 50° C.

Atmosphere: in He flow of 50 ml/min

Heating conditions: heated at 10° C./min to 800° C.

Considerations

Regarding Ag-Noble Metal Co-Loading

Figure 7:
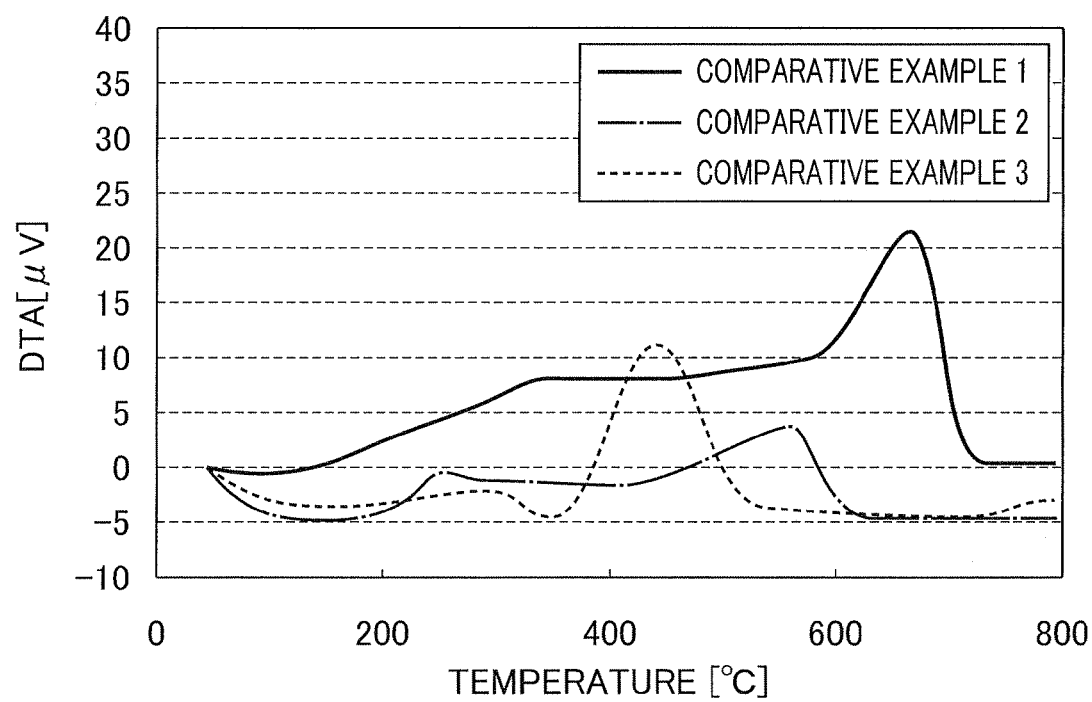
FIG. 7 is a graph showing combustion characteristics of a noble metal catalyst and a transition metal composite oxide.

PM combustion characteristic of this PM material (Comparative Example 1), 0.76% Pt/Al$_2$O$_3$+PM (5%) (Comparative Example 2), and LaMnO$_3$+PM (5%) of a composite oxide made of perovskite type (Comparative Example 3) are shown in FIG. 7. It can be understood from Comparative Example 1 that the combustion peak temperature for only the PM material itself is 668° C. Contrary to this, for a noble metal-based material such as Comparative Example 2, it can be understood that there are two peaks: a first peak at 247° C. and a second peak at 561° C. It has been reveled also from analysis of the evolved gas that, for each combustion peak, the first peak originates from organic components and the second peak from soot. From these findings, it is understood that, although the noble metal-based material has an effect in the combustion of organic components, soot cannot be combusted well at relatively low temperatures. From there being an oxidation reaction at the active species surface similarly to hydrocarbon gas, these were assumed to be due to the organic component that is more thermally unstable than soot easily dissociating and adsorbing to the active species at an early stage. In addition, in a case of these noble metal catalysts such as of Pt and Pd, the performance is almost unaffected from the amount of the noble metal.

On the other hand, for a transition metal composite oxide such as LaMnO$_3$+PM (5%) (Comparative Example 3), the separation of combustion peaks as in noble metal-based materials was almost unrecognized. As a result, in such composite oxides, the organic components do not combust at an early stage, and it was believed to be combusted with soot. In addition, in the case of composite oxides, contrary to noble metal-based materials, it was possible to combust soot at relatively low temperatures. Therefore, the transition metal composite oxides are said to be effective in soot combustion. It is believed that these results depend on the oxygen releasing capacity according to the change in valance of the composite oxide, and there being no combustion of organic components on the low temperature side at which there is no oxygen release results in combustion simultaneously with soot. That is, it is believed that combustion of PM becomes possible at lower temperatures with the oxygen releasing capacity increasing.

Incidentally, the exhaust gas temperature emitted from existing internal combustion engines is as low as 200° C. to, 450° C. As a result, with regard to organic components, the combustion is sufficiently possible in the exhaust gas temperature range by using a noble metal-based material. However, for the combustion of soot, despite being combustible at somewhat low temperatures with a catalyst material such as that of Comparative Example 3, it is said to be difficult to carry out continuous combustion in the exhaust gas temperature range without performing a regeneration process.

Contrary to this, in the present embodiment, the oxygen releasing capacity of composite oxides is greatly improved by co-loading Ag and a noble metal onto a composite oxide having oxygen releasing capacity, and thus improvement of PM combustion characteristics could be successfully achieved.

Figure 8:
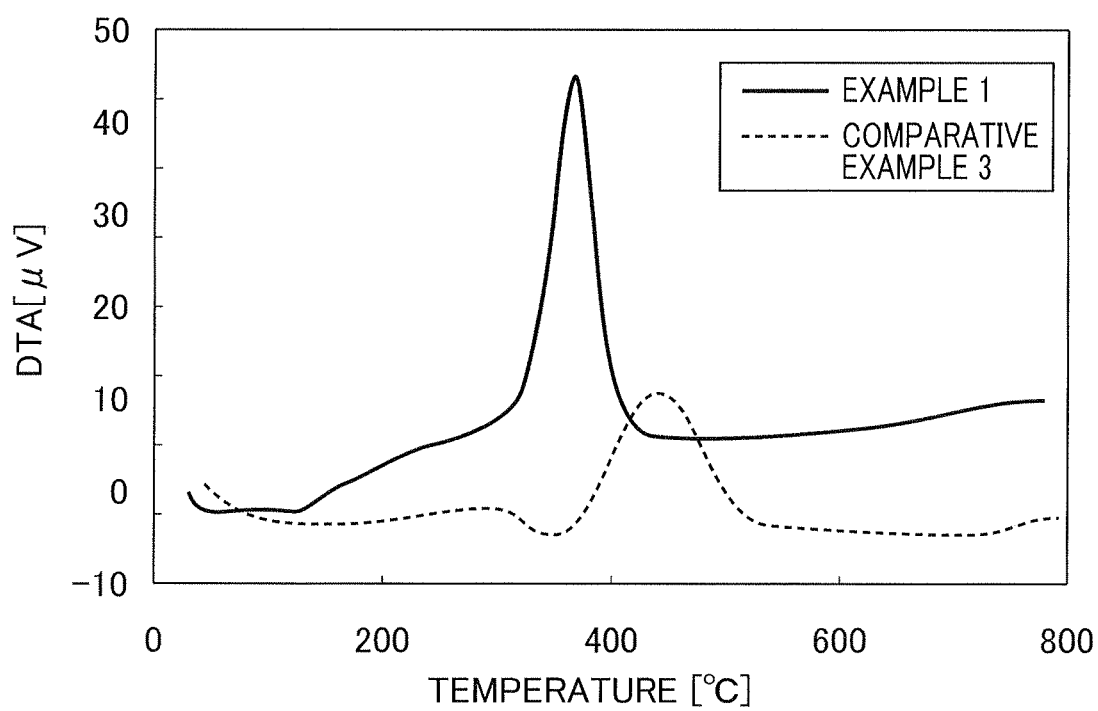
FIG. 8 is a graph illustrating the effects of Ag-noble metal co-loading.

FIG. 8 shows the combustion characteristics of 1% Pd 30% $Ag/LaMnO_3$+PM (5%) (Example 1). It can be understood by comparing with Comparative Example 3 collectively shown in FIG. 8 that PM combustion characteristics indicate possibility of combustion at significantly lower temperatures. As shown in Table 1, lowering of the PM combustion peak temperature is achieved by 85° C., from 454° C. of Comparative Example 3 to 369° C. This is a result from co-loading Pd as a noble metal and Ag onto a composite oxide having oxygen releasing capacity. Originally, $Ag_2O$ is extraordinarily highly active to PM (refer to Comparative Example 15 in Table 1). $Ag_2O$ is believed to cause a reduction reaction by contacting with PM. However, since $Ag_2O$ has a characteristic of volatilizing due to a reduction reaction, it cannot be used independently in view of heat resistance.

Then, there is a method whereby agglomeration and volatilization is suppressed by loading Ag onto a composite oxide. Although it is believed that Ag exists in the form of Ag or $Ag_2O$ on the composite oxide, the Ag reduced by the reaction effectively operates by being loaded onto the composite oxide. More specifically, Ag tends to forcibly capture oxygen by altering the valence of the composite oxide in order to be reactivated while suppressing volatilization of Ag thus reduced. It is assumed that the oxygen releasing capacity of the overall catalyst is raised by repeating these steps, whereby a lowering in the PM combustion temperature is achieved. That is, it is possible to extract oxygen releasing capacity of the composite oxide at lower temperatures by loading Ag, which has high activity to PM, onto the composite oxide having oxygen releasing capacity.

Figure 9:
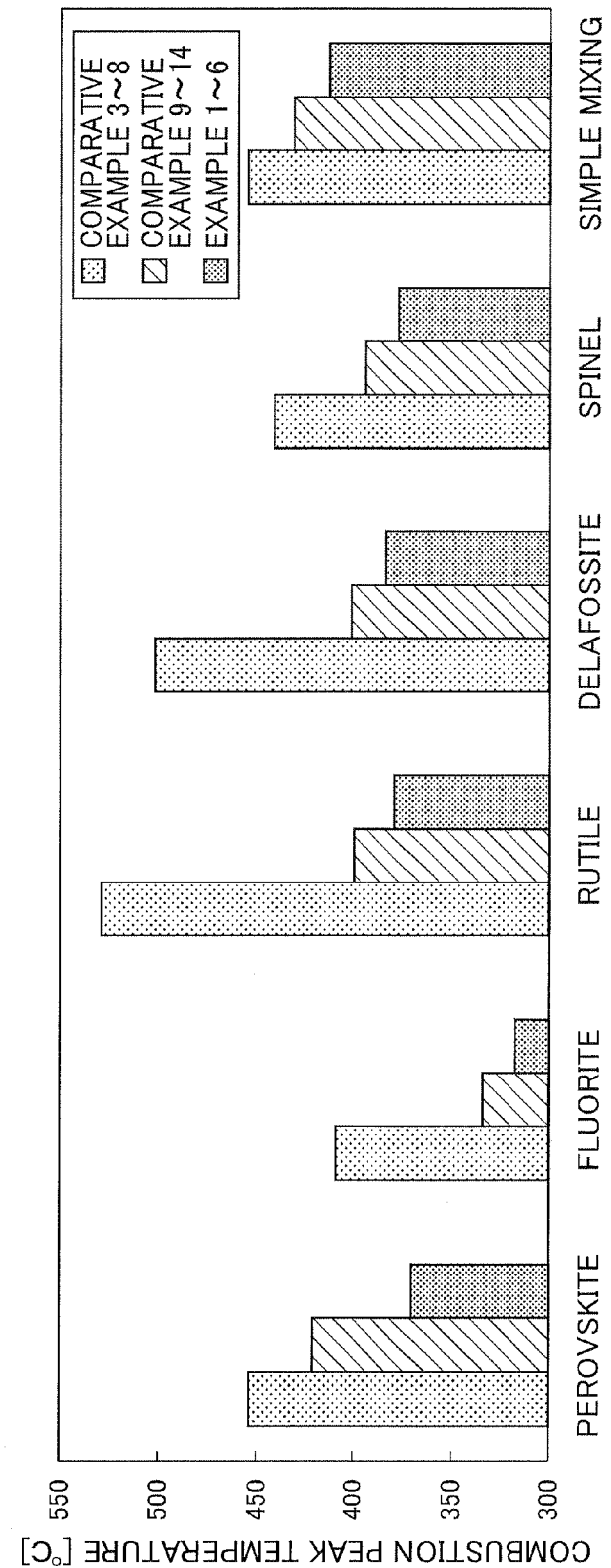
FIG. 9 is a graph showing combustion characteristics of a variety of composite oxides.

This Ag loaded composite oxide has a property of absorbing and maintaining oxygen in an oxygen rich atmosphere, and of releasing the oxygen when the oxygen concentration drops. That is to say, when the oxygen concentration in the exhaust gas drops, or when the carbon-containing suspended particulates deposit on the catalyst and the oxygen concentration of the surrounding area drops, it is possible for reactive oxygen to be released and the carbon-containing suspended particulates on the catalyst to be combusted. As shown in FIG. 9, with regards to this aspect, verification is also possible from the findings that, the PM combustion peak temperatures of the Ag loaded composite oxides of Comparative Examples 9 to 14 drop relative to the single composite oxides having various structures of Comparative Examples 3 to 8 (perovskite-type composite oxide, fluorite-type composite oxide, rutile-type composite oxide, delafossite-type composite oxide, spinel-type composite oxide, and composite oxides only simply mixing with an element), suggesting the improvement of the activity.

On the other hand, as shown in FIG. 9, it can be understood that the PM combustion characteristics are greatly improved in Examples 1 to 6 relative to the Ag loaded composite oxides of Comparative Examples 9 to 14. In addition to loading Ag to the composite oxide having oxygen releasing capacity, the present invention is characterized by co-loading a noble metal element as an element other than Ag. As a result, it has been confirmed that PM combustion characteristics are greatly improved by co-loading Ag and a noble metal to a composite oxide having oxygen releasing capacity.

Figure 10:
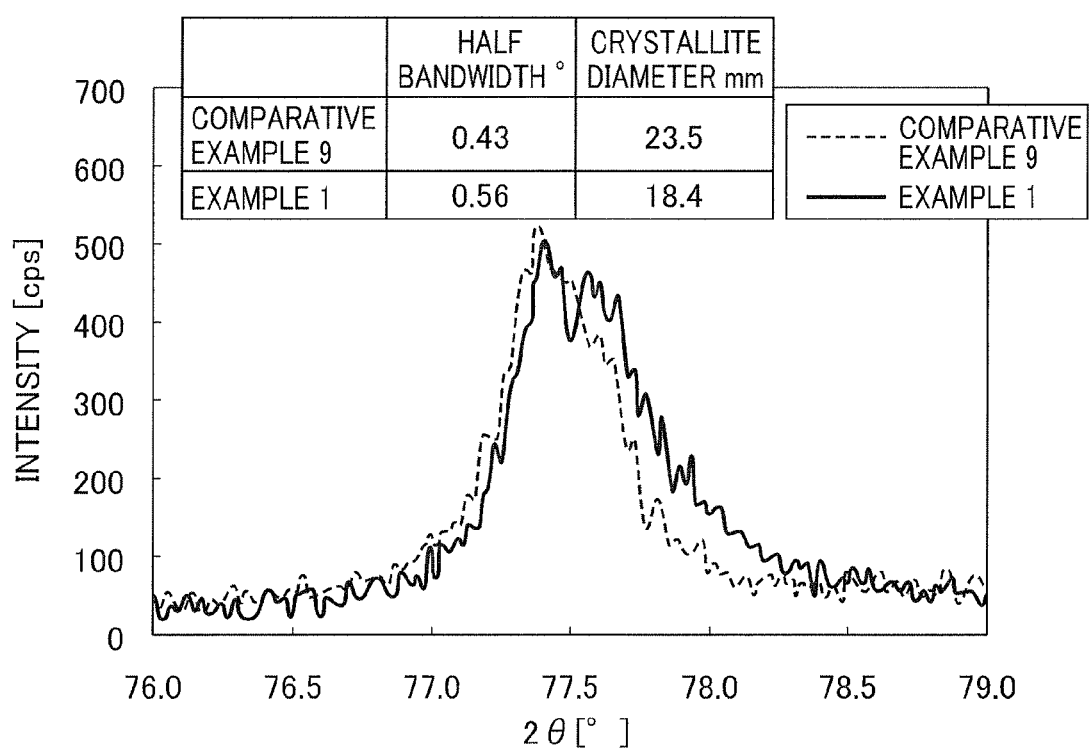
FIG. 10 is a graph showing structural analysis results from X-ray diffraction measurements.
Figure 11:
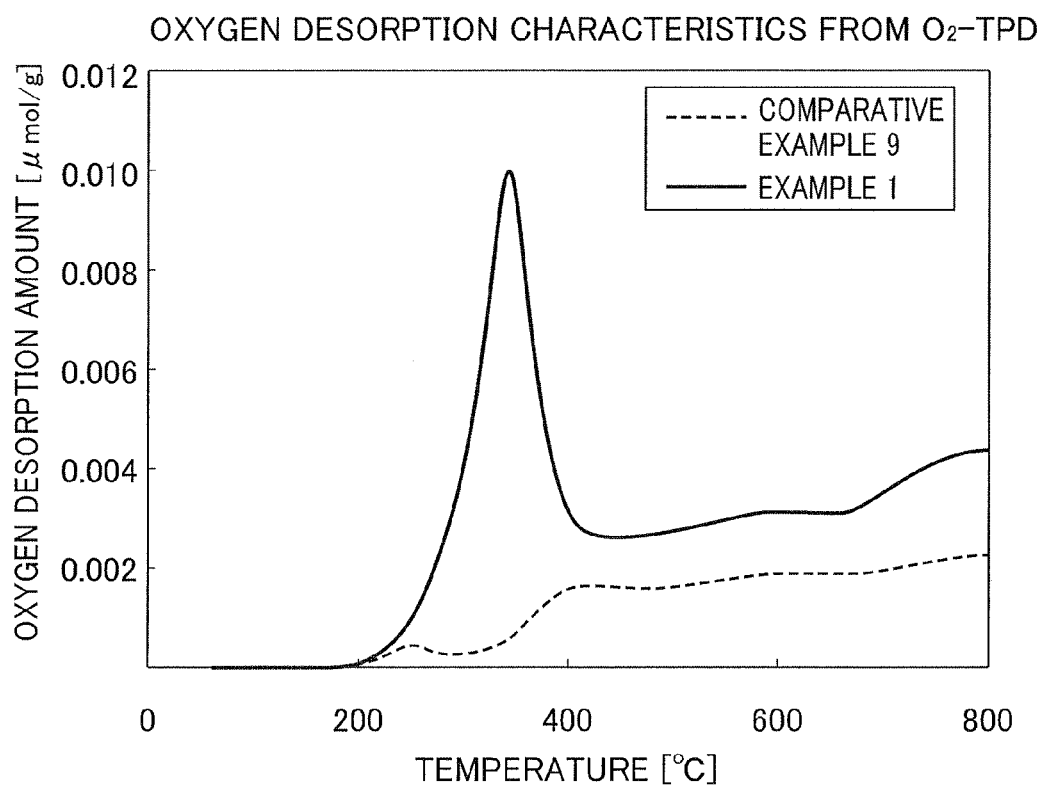
FIG. 11 is a graph showing oxygen desorption characteristics by $O_2$-TPD.

With the Ag-noble metal co-loaded composite oxide, although the reactivity with PM is not as great as with only Ag, it is considered that, by co-loading a small amount of a noble metal effective in activating oxygen near Ag, it acts as a promoter catalyst for oxygen supply to the Ag. In addition, it is considered that the agglomeration of Ag particles is suppressed by co-loading a small amount of a noble metal near the Ag, whereby a role of maintaining Ag nano-particles is satisfied. As a result, the oxygen release amount of the Ag-noble metal co-loaded composite oxide increases, and thus PM combustion characteristics are greatly improved. This is verified from the Ag crystallite diameter calculated from the structural analysis results by X-ray diffraction shown in FIG. 10, and the measurement results of the oxygen desorption amount by $O_2$-TPD analysis shown in FIG. 11. That is, the scale of the Ag particle diameter being decreased to the nano-scale due to Pd addition is verified by FIG. 10, and the oxygen desorption amount being increased due to Pd addition is verified by FIG. 11. In this way, it can be said that Ag-noble metal co-loaded composite oxide is necessary for miniaturizing Ag particles to increase the oxygen desorption amount in order to improve PM combustion characteristics.

Added Amount of Noble Metal

Figure 12:
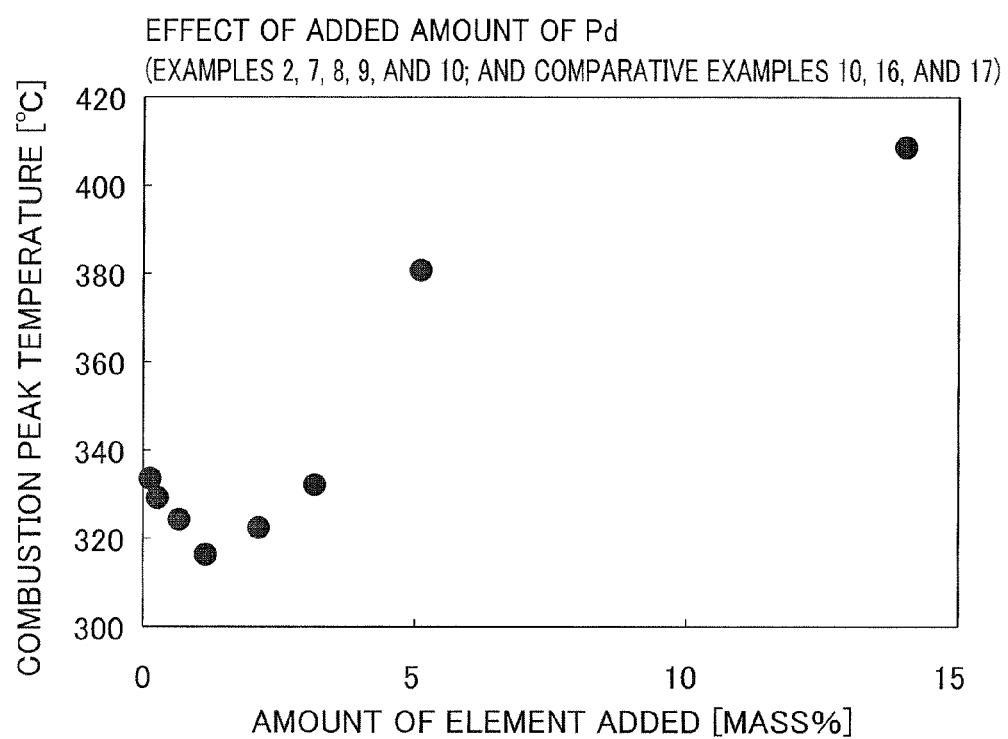
FIG. 12 is a graph illustrating an added amount of a noble metal.

Consideration has been given to the content of the noble metal in the Ag-noble metal co-loaded composite oxide. The effect of Pd content in $PdAg/CeZrO_2$ is shown in FIG. 12. As shown in FIG. 12, although there is high activity in Examples 2, and 7 to 10, which have a Pd amount of 0.1 to 3.0 mass %, the activity is low with a Pd amount of 0 mass % and 5 mass % or greater (Comparative Examples 10, 16, and 17). From these results, the effect of an added element is strong and becomes dominant in a case where the added amount of Pd is large, from which it is considered to be close to the performance of $Pd/CeZrO_2$. In a case where the added amount of Pd is 0, it is assumed that suppression of Ag agglomeration and increasing the oxygen desorption amount become impossible. Therefore, it has been confirmed that the content of the noble metal of the Ag-noble metal co-loaded composite oxide is preferably 0.1 mass % to 3.0 mass %, and more preferably 0.5 mass % to 2.0 mass %.

Type of Noble Metal

Figure 13:
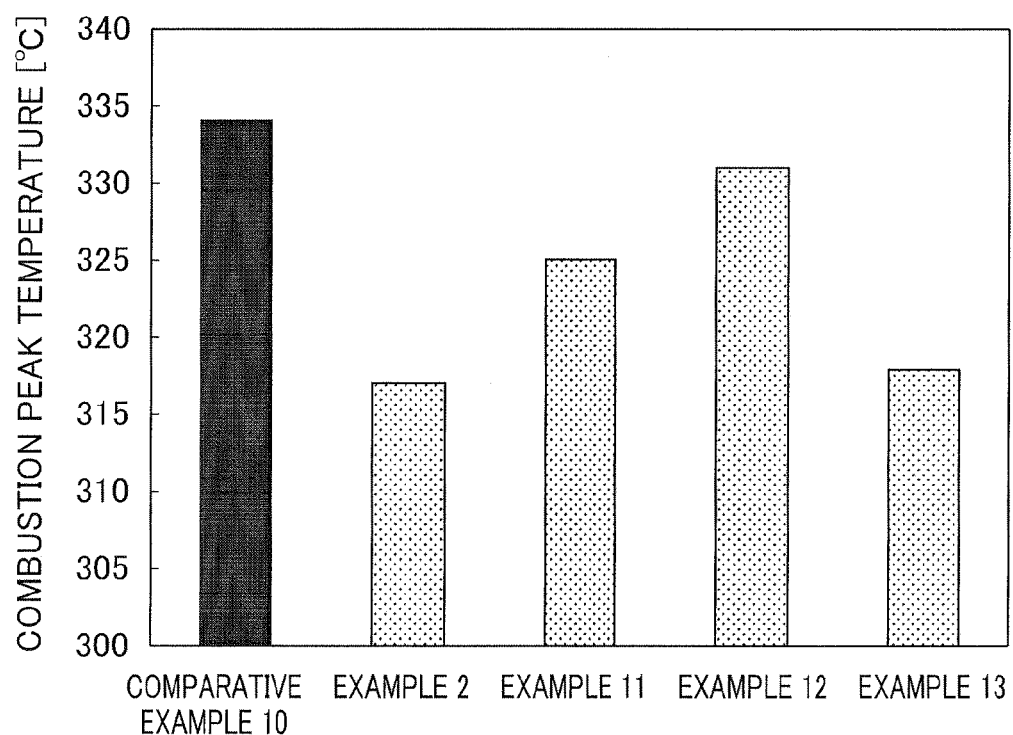
FIG. 13 is a graph illustrating the necessity of adding a noble metal element.

Consideration has been given to the type of the noble metal in the Ag-noble metal co-loaded composite oxide. The PM combustion peak temperatures for cases (Examples 2, and 11 to 13), in which 1 mass % of the noble metal has been added to $Ag/CeZrO_2$ of Comparative Example 10, are shown in FIG. 13. It can be understood that the activity improves by adding 1 mass % of the noble metal compared to before addition. From this, it has been confirmed that an improving effect on PM combustion characteristics is exhibited by adding at least one element selected from noble metals.

Figure 14:
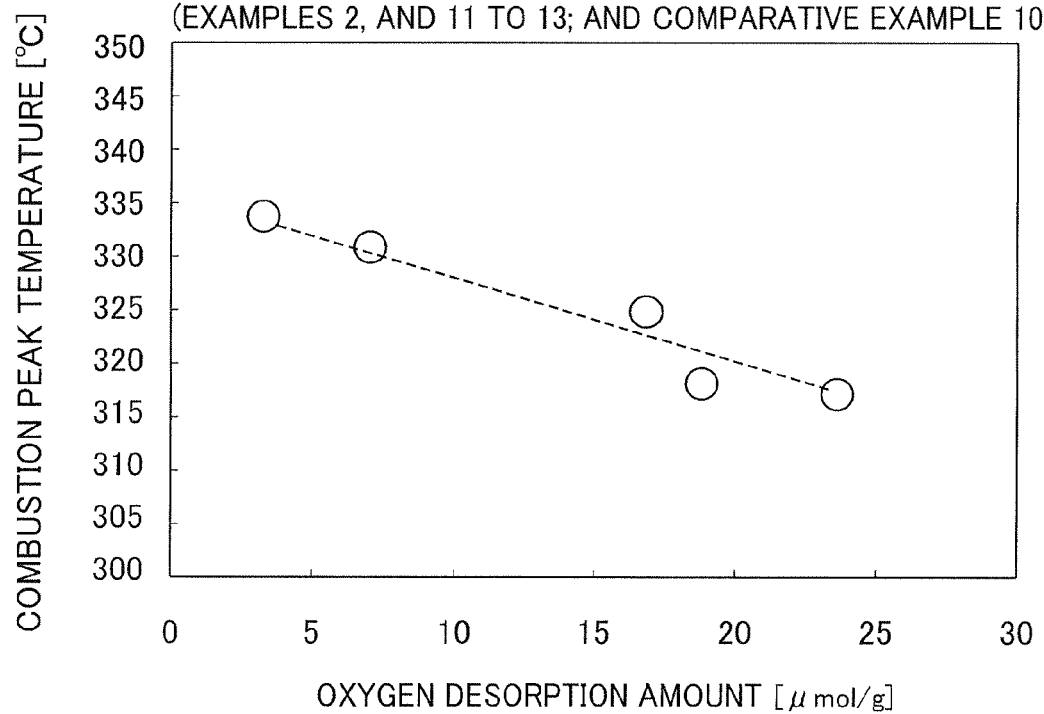
FIG. 14 is a graph illustrating effects due to adding a noble metal element.

In addition, for each catalyst shown in FIG. 13, FIG. 14 shows the relationships between oxygen desorption amount calculated from the oxygen desorption characteristics by $O_2$-TPD, and PM combustion peak temperature. As shown in FIG. 14, it can be understood that the oxygen desorption amount resulting from Ag increases and the PM combustion characteristics improve by adding each element. These are assumed to be due to the effects of Ag miniaturization and oxygen supply assistance by the added element.

Oxygen Releasing Capacity

Figure 15:
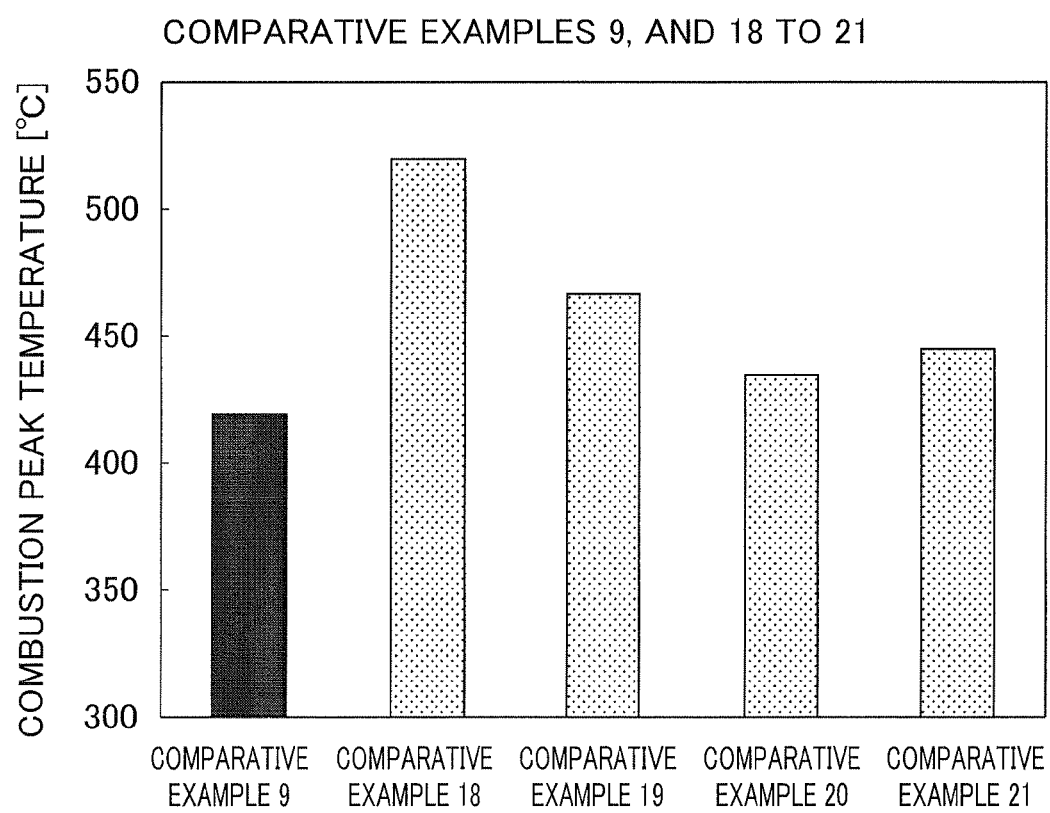
FIG. 15 is a graph illustrating the necessity of oxygen releasing capacity of the composite oxide.

Next, for a composite oxide not having oxygen releasing capacity (Comparative Example 18), a single oxide having oxygen releasing capacity and a physically mixed oxide thereof (Comparative Examples 19 to 21), performance was compared with cases in which Ag was loaded thereto, respectively. The results are shown in FIG. 15. As shown in FIG. 15, with the PM combustion peak temperature of Comparative Example 18 being a high temperature at 521° C., suggesting the PM combustion characteristics being inferior, this is considered to be a characteristic due to only Ag. In addition, the performance at high temperatures is inferior for Comparative Examples 19 and 20 respectively exhibiting 468° C. and 435° C., when also comparing with Example 1, and it is believed that this is due to the oxygen releasing capacity of the single oxide, which is the carrier, being low. Furthermore, that of Comparative Example 21, which is physically mixed with these, is 445° C., and could not be lowered in combustion temperature as much as this. Therefore, when considering the combustion of soot in a diesel exhaust gas temperature range, the anticipated performance cannot be obtained by composite oxides not having oxygen releasing capacity, single oxides having low oxygen releasing capacity, and physically combination of a single oxide. As a result, it has been confirmed that using a composite oxide having oxygen releasing capacity such as Comparative Example 9 is important.

Here, definitions of oxides having oxygen releasing capacity are explained in detail. In temperature-programmed desorption (TPD) experiments in a He atmosphere and/or temperature-programmed reduction (TPR) experiments using hydrogen, with lower oxygen desorption start temperature/hydrogen consumption start temperature, the oxygen desorption is made easy, and the area of desorption/consumption characteristics is defined as the oxygen desorption amount. Such ease of desorption and the oxygen desorption amount are defined as the oxygen releasing capacity, and in particular an oxide such as a composite oxide that induces a change in valence depending on alteration of the atmosphere to cause oxygen in the oxide to be absorbed or released is defined as an oxide having oxygen releasing capacity.

Figure 16:
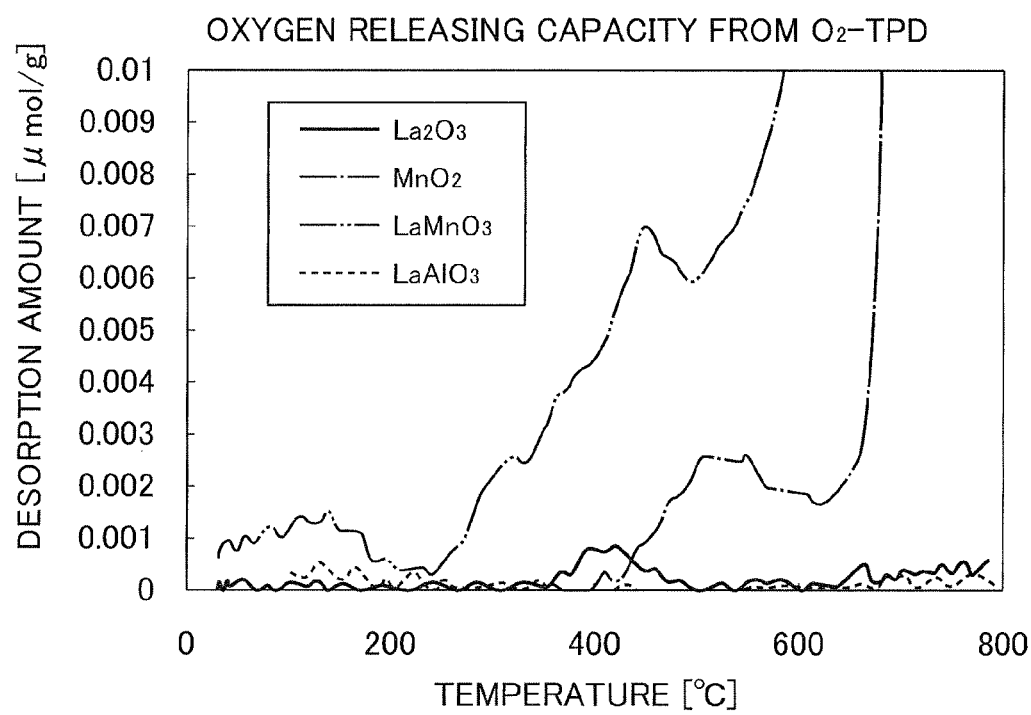
FIG. 16 is a graph showing the oxygen releasing capacity of a variety of composite oxides.

FIG. 16 shows results of measuring the oxygen releasing capacity of $La_2O_3$, $MnO_2$, $LaMnO_3$, and $LaAlO_3$ by $O_2$-TPD. The horizontal axis represents temperature and the vertical axis represents oxygen desorption amount, indicating the ease of thermal desorption of oxygen under a He atmosphere. $La_2O_3$ releases oxygen at approximately 360° C.; however, the peak area is small and thus the oxygen releasing capacity is considered to be small. On the other hand, $MnO_2$ starts to release oxygen from approximately 400° C., and the released amount increases in accordance with becoming a high temperature in this state. In addition, in $LaMnO_3$ of perovskite structure, which these composite oxides are, the temperature at which the release of oxygen begins further decreases, and is from approximately 250° C. However, contrary to these, it is understood that $LaAlO_3$ does not possess oxygen releasing capacity over the entire temperature range. As such, for each of the oxides and composite oxides, there are those that have and those that do not have any oxygen releasing capacity, and thus the oxygen releasing performance of each is different. Here, it is understood that $La_2O_3$ does not have oxygen releasing capacity at 600° C. or above, contrary to $Mn_2O_3$ for which the oxygen releasing capacity improves greatly from approximately 600° C. Considering the results of Comparative Examples 19 and 20 in view of these facts, it is assumed that oxygen releasing capacity at and above 600° C. does not contribute to the PM combustion characteristics. Rather than the released amount of oxygen in the catalyst, the ease of desorption of oxygen at low temperatures, i.e. the oxygen desorption energy, is assumed to become an important factor in PM combustion. Therefore, an oxide for which desorption of oxygen starts at no higher than 600° C. and has a large oxygen desorption amount in temperature-programmed desorption experiments (TPD) under a He atmosphere can be defined as having oxygen releasing capacity.

Noble Metal Other than Ag

Figure 17:
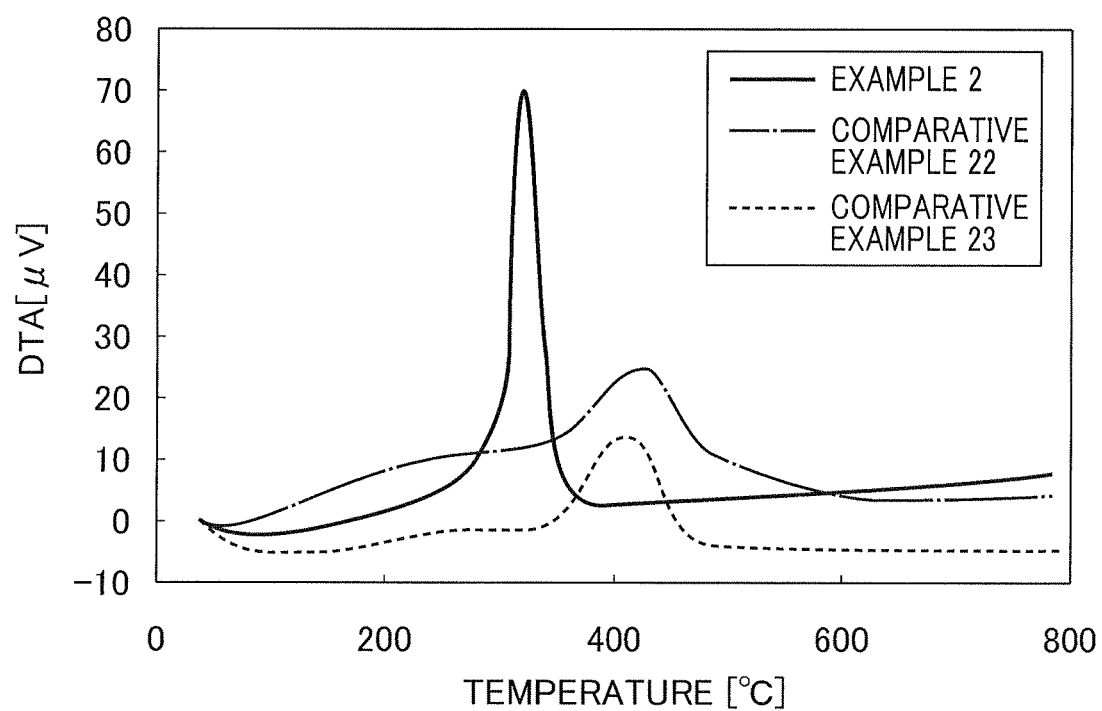
FIG. 17 is a graph illustrating the necessity of a noble metal other than Ag.

Consideration was given to a case where a noble metal other than Ag was loaded to a composite oxide having oxygen releasing capacity (refer to Patent Document 4). FIG. 17 shows combustion characteristics for cases in which Pt and Pd were loaded onto $CeZrO_2$ (Comparative Examples 22 and 23). When compared to Example 2, it can be understood that the PM combustion characteristics are inferior in all cases, and it can be said that among noble metal elements, Ag has high performance, specifically in PM activity. In addition, the loading amount of Pt and Pd in Comparative Examples 22 and 23 is low, and it has be proven that if the loading amount were high, the activity would further decrease. If considering the interaction with the composite oxide, from the point of view of improving performance over Comparative Examples 4 and 10, bringing about more of a valence change in the composite oxide is possible with Ag, and high activity can not be obtained with solely Pt or Pd. Therefore, it can be said that high activity can be obtained first by co-loaded Pt, Pd or the like with Ag.

Method of Adding Ag

Figure 18:
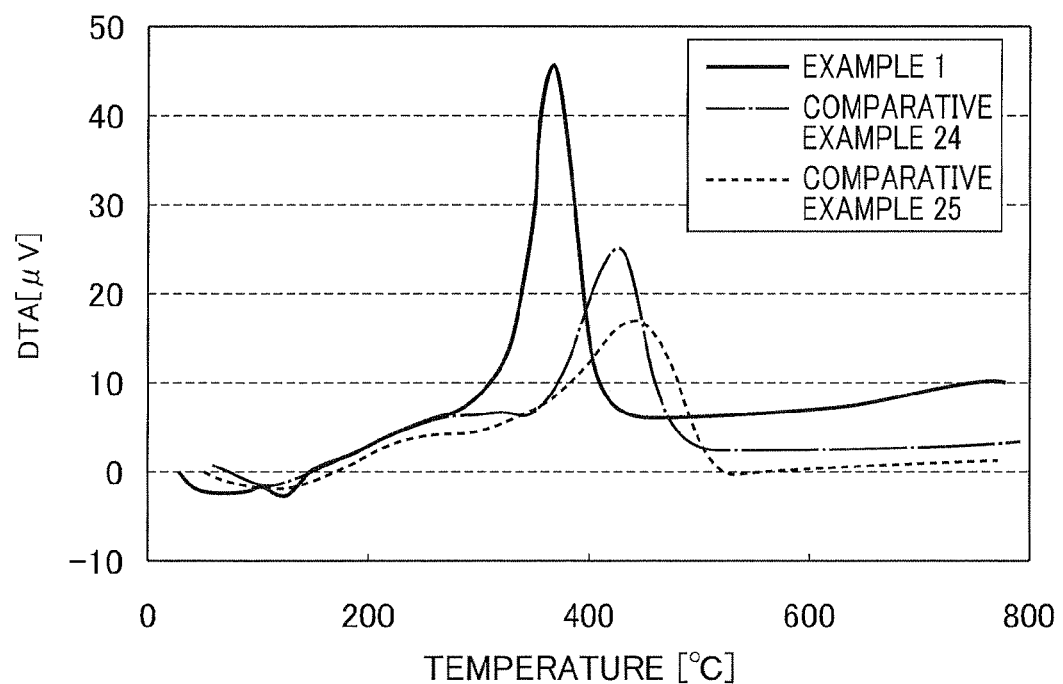
FIG. 18 is a graph illustrating a method of adding Ag to the composite oxide.

Consideration was given to a method of adding Ag to the composite oxide. Comparative Example 24 is a case in which Ag has been made a solid solution in the composite oxide (refer to Patent Document 1), and Comparative Example 25 is a case in which Ag is allowed to react in solid phase with the composite oxide (refer to Patent Document 3). The combustion characteristics of these are shown in FIG. 18. Compared to Example 1, it can be understood that Comparative Examples 24 and 25 have inferior performance. Relating to Comparative Example 24, the active species is embedded in the crystal structure of $LaMnO_3$ due to making a solid solution of Ag, leading to failure in contact with PM, which becomes a reducing agent, whereby the valence change in Ag cannot be brought about, which is considered to result in the performance being inferior compared to a case of impregnation. On the other hand, relating to Comparative Example 25, the active species is volatilized due to poor heat resistance, and thus it is considered that it has the performance of only $LaMnO_3$. Therefore, since it is necessary for the temperature to be lowered for oxygen releasing capacity by interaction with the composite oxide while the active species is exposed to the top surface of $LaMnO_3$ as in Example 1, and further it is considered absolutely necessary to achieve loading of Ag to the composite oxide by addition in order to suppress agglomeration and volatilization of Ag.

Heat Resistance

Figure 19:
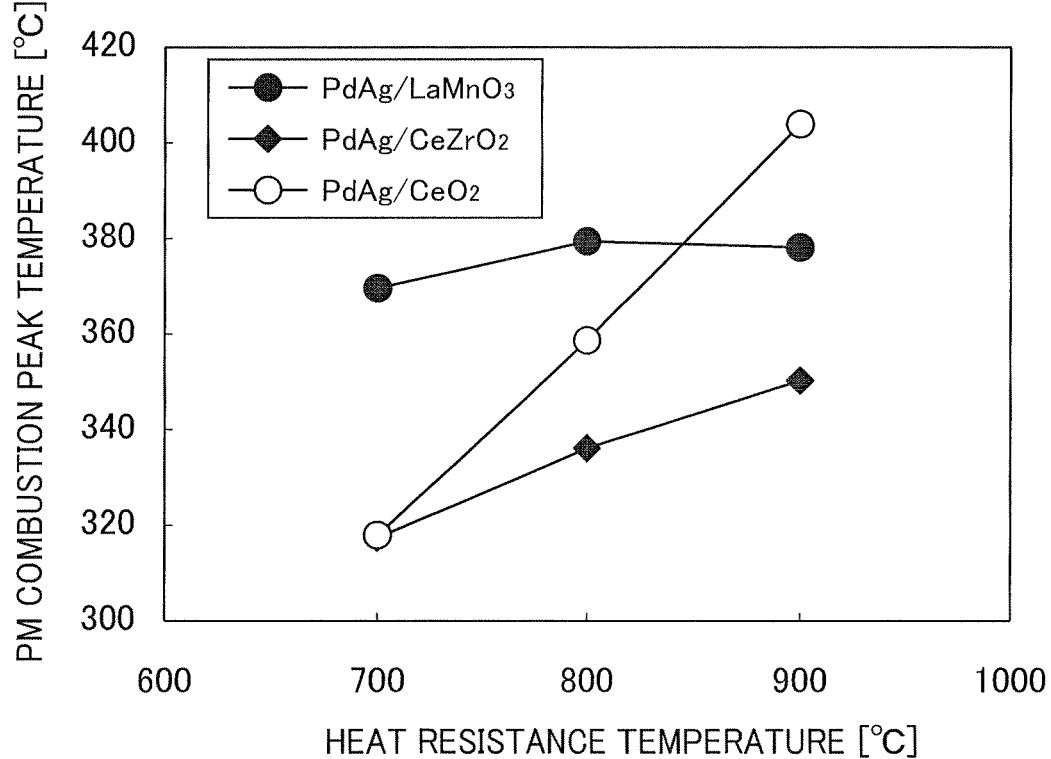
FIG. 19 is a graph illustrating the heat resistance of Ag-noble metal co-supported composite oxides.

Consideration was given to the effects of carrying out an aging treatment from the view point of heat resistance of the Ag-noble metal co-loaded composite oxide. Comparative Examples 26, 27 and 28 demonstrate the before and after subjecting to a heat resistance condition of 1% Pd 30% Ag/$CeO_2$ (refer to Patent Document 2), Examples 14 and 15 demonstrate the after subjecting to a heat resistance condition of 1% Pd 30% Ag/$LaMnO_3$, and Examples 16 and 17 demonstrate the after subjecting to a heat resistance condition of 1% Pd 30% Ag/$CeZrO_2$, with the heat resistance conditions each being an atmospheric heat treatment for 20 h at 800° C. and for 20 h at 900° C. The combustion characteristics of these are shown in FIG. 19. In FIG. 19, the horizontal axis is the atmospheric aging treatment temperature, and the treatment temperature before aging for each example employed the firing temperature during sample preparation. Since $CeO_2$ is widely known as being extraordinarily superior in oxygen releasing capacity, it is considered that co-loading Ag and a small amount of an element other than Ag onto $CeO_2$, which has a high oxygen releasing capacity, is also effective. However, despite preferable performance shown with a PM combustion peak temperature of 318° C. before aging (Comparative Example 26), the performance was greatly deteriorated after aging, with the PM combustion peak temperature of 358° C. and 445° C. (Comparative Examples 27 and 28). This is assumed to be due to thermal breakdown of the structure of $CeO_2$, which is the base oxide, and to agglomeration and vaporization of Ag. As a result, it can be understood that the performance of $Ag/CeO_2$ deteriorates depending on aging conditions, whereby PM cannot be sufficiently combusted over the exhaust gas temperature range of actual operation. Contrary to this, it can be understood that the PM combustion characteristics before and after aging of 1% Pd 30% $Ag/LaMnO_3$ and 1% Pd 30% $Ag/CeZrO_2$, demonstrated with Examples 1 and 2 and Examples 14 to 17, do not change greatly. Since the structural formation temperature is a temperature from 600° C. to 1000° C., structural breakdown does not easily occur in the aging temperature range, and thus it is assumed that this is due to Ag agglomeration and vaporization not easily occurring by way of interaction between the composite oxide and Ag. Therefore, the expected performance can be exhibited by co-loading Ag and an element other than Ag to a composite oxide having heat resistance. From the foregoing, an exhaust gas purification catalyst can be provided that can endure use under the floor as well as immediately following the engine, even for high heat-resistance requirements such as the case assumed for large displacement/high output engines in the future, without being influenced by the exhaust layout.

Next, more practical examples of the present invention are explained.

Example 18

Catalyst Powder Preparation

The above-mentioned catalyst D was used as the Ag-noble metal co-loaded composite oxide catalyst.
Preparation of Oxidation Catalyst Powder An aqueous solution containing a predetermined amount of platinum nitrate was prepared. Gamma alumina and the aqueous solution were placed into an eggplant-shaped flask, and impregnation loading was carried out with a rotary evaporator. After drying the product at 200° C. for 1 h, firing was carried out at 700° C. for 2 h, whereby $Pt/Al_2O_3$ was prepared.
Loading to DPF A catalyst slurry was prepared by placing the Ag-noble metal co-loaded composite oxide catalyst (powder), water, $SiO_2$ sol, and alumina balls in a container, and carrying out wet milling with a ball mill over night. After dipping the DPF in the catalyst slurry, it was lifted out and excess slurry was removed therefrom with compressed air. This was dried at 200° C. for 2 h, and then the weight was measured. After repeating this operation until loading a predetermined amount, firing was carried out at 700° C. for 2 h.
Honeycomb Loading of Oxidation Catalyst A catalyst slurry was prepared by placing the oxidation catalyst powder, water, $SiO_2$ sol, and alumina balls in a container, and carrying out wet milling with a ball mill over night. After dipping a cordierite honeycomb in the catalyst slurry, it was lifted out and excess slurry was removed therefrom with compressed air. This was dried at 200° C. for 2 h, and then the weight was measured. After repeating this operation until loading a predetermined amount, firing was carried out at 700° C. for 2 h.
Production of Converter The DPF with the catalyst thus produced and the oxidation catalyst were arranged in a single converter so that the oxidation catalyst was upstream from the DPF with the catalyst.

Example 19

Catalyst Powder Preparation

The above-mentioned catalyst D was used as the Ag-noble metal co-loaded composite oxide catalyst.
Preparation of $NO_2$-Generating Catalyst Powder An aqueous solution containing predetermined amounts of palladium nitrate and platinum nitrate was prepared. Gamma alumina and the aqueous solution were placed into an eggplant-shaped flask, and impregnation loading was carried out with a rotary evaporator. After drying the product at 200° C. for 1 h, firing was carried out at 700° C. for 2 h, whereby $PtPd/Al_2O_3$ was prepared.
Loading to DPF
Lower Layer A catalyst slurry was prepared by placing the Ag-noble metal co-loaded composite oxide catalyst (powder), water, $SiO_2$ sol, and alumina balls in a container, and carrying out wet milling with a ball mill over night. After dipping the DPF in the catalyst slurry, it was lifted out and excess slurry was removed therefrom with compressed air. This was dried at 200° C. for 2 h, and then the weight was measured. After repeating this operation until loading a predetermined amount, firing was carried out at 700° C. for 2 h.
Upper Layer A catalyst slurry was prepared by placing the $NO_2$-generating catalyst powder, water, $SiO_2$ sol, alumina balls, and starch with a particle size of 1 µm as a pore-forming agent in a container, and carrying out wet milling with a ball mill over night. After dipping the DPF in the catalyst slurry, it was lifted out and excess slurry was removed therefrom with compressed air. This was dried at 200° C. for 2 h, and then the weight was measured. After repeating this operation until loading a predetermined amount, firing was carried out at 700° C. for 2 h.
Production of Converter The DPF with the catalyst thus produced and the oxidation catalyst of Example 21 were arranged in a single converter so that the oxidation catalyst was upstream from the DPF with the catalyst.

Comparative Example 29

Except for loading only the $NO_2$-generating catalyst directly onto the DPF, it was produced by carrying out the same operation.

Comparative Example 30

Except for loading without using a pore-forming material when loading the $NO_2$-generating catalyst, it was produced by carrying out the same operation.

Comparative Example 31

A DPF was used without catalyst loading.
Evaluation of Practicality
An engine bench test was conducted as an evaluation close to practical conditions. The engine used was a 2.2 L diesel engine, and the test was performed in a configuration in which an integrated converter having a DPF with the catalyst and an oxidation catalyst was arranged at a position immediately following the engine, as shown in FIGS. 1 and 2. The engine used was a 2.2 L diesel engine, the DPF volume was 2 L, and the oxidation catalyst volume was 1 L. More specifically, evaluation of low temperature continuous combustion performance and evaluation of forced regeneration performance were conducted as described below. The evaluation results are shown in Table 3.

TABLE 3

| Sample | Oxidation Catalyst | Lower Layer | Upper Layer |
|---|---|---|---|
| Example 18 | Pt/Al$_2$O$_3$ | PdAg/CeZrO$_2$ | none |
| Example 19 | Pt/Al$_2$O$_3$ | PdAg/CeZrO$_2$ | PtPd/Al$_2$O$_3$ |
| Comparative Example 29 | Pt/Al$_2$O$_3$ | PtPd/Al$_2$O$_3$ | none |
| Comparative Example 30 | Pt/Al$_2$O$_3$ | PdAg/CeZrO$_2$ | PtPd/Al$_2$O$_3$ (no pore-forming agent) |
| Comparative Example 31 | Pt/Al$_2$O$_3$ | none | none |

Figure 20:
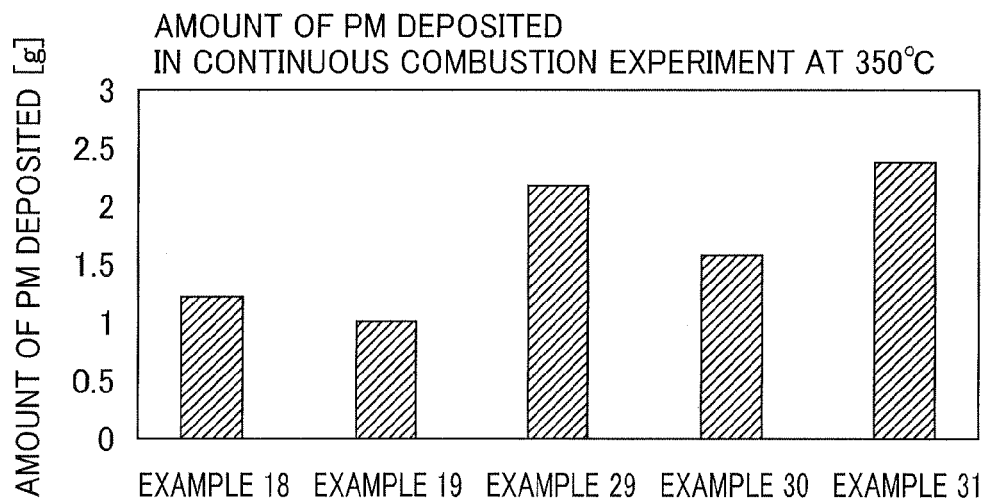
FIG. 20 is a graph showing evaluation results of low-temperature continuous combustion performance.

Evaluation of Low Temperature Continuous Combustions Performance
Evaluation of low temperature continuous combustion performance was carried out by setting, as the amount of PM deposited, the increased amount of weight, after 8 hours of maintaining under conditions in which the temperature before the oxidation catalyst was approximately 350° C.
Evaluation of Forced Regeneration Performance
Evaluation of forced regeneration performance was carried out by comparing times until combustion was completed in a case where PM was accumulated at a low temperature beforehand, and then forced regeneration was carried out at a temperature before the DPF of 600° C. In forced regeneration, fuel addition was performed by post injection, DPF temperature was raised up to a target temperature by way of the thermal combustion reaction at the oxidation catalyst, which was stopped every predetermined time, and the weight was measured. In addition, the PM accumulation was carried out by maintaining a temperature before the DPF of approximately 150° C. Measurement times were at 2 minutes, 10 minutes, 30 minutes, and 60 minutes, and a comparison of times until PM was 90% combusted was carried on based on these results.
Considerations
The evaluation results of low temperature continuous combustion performance are shown in FIG. 20. As shown in FIG. 20, it has been confirmed that, in the continuous combustion experiment at 350° C., the amount of PM deposited on Examples 18 and 19 is smaller compared to Comparative Examples 29 to 31. From this it can be understood that the PM emitted while driving can be combustively removed with good efficiency according to Examples 18 and 19. It is considered that Example 19 being more superior is an effect of being made in two layers.

Figure 21:
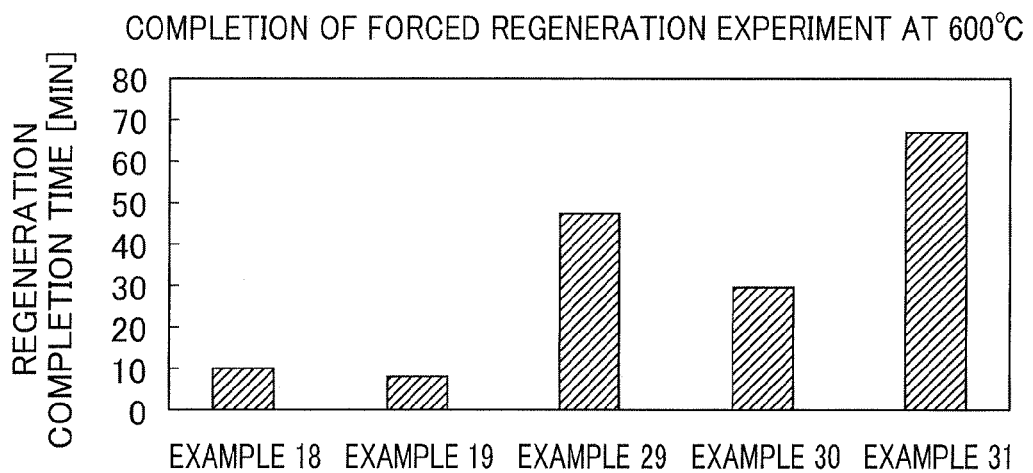
FIG. 21 is a graph showing evaluation results of forced regeneration performance.

The evaluation results of forced regeneration performance are shown in FIG. 21. As shown in FIG. 21, it can be understood that, in the forced regeneration experiment at 600° C., the combustion rate during regeneration is higher because the time until regeneration is completed for Examples 18 and 19 was shorter compared to Comparative Examples 29 to 31. It is considered that Example 19 being more superior is an effect of being made in two layers.

The invention claimed is:

1. An exhaust gas purification catalyst for removing particulate matter in exhaust gas emitted from an internal combustion engine, the exhaust gas purification catalyst comprising: a composite oxide having an oxygen releasing capacity, and Ag and Pd co-loaded on the composite oxide, wherein the composite oxide is CeZrO2, wherein the content of the noble metal Pd relative to the exhaust gas purification catalyst is in the range of 0.5 mass % to 2.0 mass %, and wherein the content of the Ag relative to the exhaust gas purification catalyst is 30 mass %.

2. An exhaust gas purification apparatus that is disposed in an exhaust gas passage of an internal combustion engine, and that removes particulate matter in exhaust gas emitted from the internal combustion engine, the exhaust gas purification apparatus comprising: a purification unit including a filter and a catalyst layer formed on a surface of the filter, wherein the catalyst layer contains the exhaust gas purification catalyst according to claim 1.

3. The exhaust gas purification apparatus according to claim 2, wherein the catalyst layer further contains an NO$_2$-generating catalyst that converts NO in the exhaust gas emitted from the internal combustion engine to NO$_2$.

4. The exhaust gas purification apparatus according to claim 3, wherein the catalyst layer contains a lower layer that is formed with the exhaust gas purification catalyst, and an upper layer that is formed with the NO$_2$-generating catalyst.

5. The exhaust gas purification apparatus according to claim 3, wherein the NO$_2$-generating catalyst is formed by loading at least one element selected from the group consisting of Pt, Pd, and Rh onto a carrier having a high specific surface area.

6. The exhaust gas purification apparatus according to claim 5, wherein the carrier having a high specific surface area is at least one carrier selected from the group consisting of alumina, silica, titania, ceria, zirconia, and magnesia.

7. The exhaust gas purification apparatus according to claim 4, wherein the catalyst layer contains voids in the upper layer.

8. The exhaust gas purification apparatus according to claim 7, wherein the voids have a diameter of at least 1 μm.

9. The exhaust gas purification apparatus according to claim 2, wherein the filter is a wall-flow type filter formed from a porous fire-resistant ceramic.

10. The exhaust gas purification catalyst according to claim 1, wherein the composite oxide is a fluorite structure.

* * * * *